(12) United States Patent
Yasinover et al.

(10) Patent No.: US 9,538,020 B2
(45) Date of Patent: Jan. 3, 2017

(54) WORK FLOW AND FINISHING FOR PRINT PRODUCTION OF PHOTOGRAPH IMAGES

(71) Applicant: HEWLETT-PACKARD INDIGO B.V., Fort Collins, CO (US)

(72) Inventors: David Yasinover, Nes Ziona (IL); Ilan Meiri, Yavne (IL); Ran Lev, Nes Ziona (IL); Raffael Kraus, Sant Cugat del Valles (ES); Itzik Kent, Ness Ziona (IL); Uri Weiner, Ness Ziona (IL); Steve Morris, Asseret (IL)

(73) Assignee: Hewlett-Packard Indigo B.V., Amstelveen (NL)

( * ) Notice: Subject to any disclaimer, the term of this patent is extended or adjusted under 35 U.S.C. 154(b) by 0 days.

(21) Appl. No.: 14/666,130

(22) Filed: Mar. 23, 2015

(65) Prior Publication Data
US 2015/0215479 A1    Jul. 30, 2015

Related U.S. Application Data

(63) Continuation of application No. 13/459,666, filed on Apr. 30, 2012, now Pat. No. 9,025,195.

(51) Int. Cl.
*H04N 1/00* (2006.01)
*H04N 1/387* (2006.01)
(Continued)

(52) U.S. Cl.
CPC ......... *H04N 1/00188* (2013.01); *G06F 3/124* (2013.01); *G06F 3/1211* (2013.01); *G06F 3/1237* (2013.01); *G06F 3/1242* (2013.01); *G06F 3/1275* (2013.01); *G06F 3/1282* (2013.01); *G06K 15/1809* (2013.01); *G06K 15/1857* (2013.01); *G06K 15/403* (2013.01); *H04N 1/00167* (2013.01); *H04N 1/387* (2013.01)

(58) Field of Classification Search
None
See application file for complete search history.

(56) References Cited

U.S. PATENT DOCUMENTS 5,947,461 A * 9/1999 Holbrock ................. B43M 3/04
                                                        270/52.09
6,411,396 B1    6/2002 Benson et al.
(Continued)

FOREIGN PATENT DOCUMENTS

EP          1308779 A2      5/2003
JP          2006209408      8/2006
WO      WO-2011155950 A1   12/2011

*Primary Examiner* — King Poon
*Assistant Examiner* — Vincent Peren
(74) *Attorney, Agent, or Firm* — HP Inc. Patent Department

(57) ABSTRACT

Providing for workflow and finishing solutions for printing are disclosed herein. By way of example, disclosed workflow provides grouping and managing a stream(s) of digital images across a substrate width, for maximizing print productivity and profitability. Digital images are re-sized according to print instructions and oriented into a print stream. Multiple print streams can be organized onto the substrate width, to improve substrate packing. Moreover, disclosed finishing solutions provide for outputting streams of prints according to an output format, in conjunction with rendering the digital images in physical form.

14 Claims, 19 Drawing Sheets

(51) Int. Cl.
*G06F 3/12* (2006.01)
*G06K 15/02* (2006.01)
*G06K 15/00* (2006.01)

(56) References Cited

U.S. PATENT DOCUMENTS

| | | | |
|---|---|---|---|
| 7,126,708 | B1 | 10/2006 | McConn et al. |
| 8,072,642 | B2 | 12/2011 | Caine |
| 2002/0012134 | A1 | 1/2002 | Calaway |
| 2002/0034392 | A1* | 3/2002 | Baum ................ G03D 3/00 396/564 |
| 2003/0126962 | A1* | 7/2003 | Bland ................ B41J 11/46 83/13 |
| 2003/0164103 | A1* | 9/2003 | Lamothe ........... B65H 20/02 101/227 |
| 2005/0162667 | A1* | 7/2005 | Felix ............... H04N 1/00236 358/1.1 |
| 2006/0250646 | A1 | 11/2006 | Kito |
| 2010/0195155 | A1 | 8/2010 | Gustafson et al. |
| 2011/0069329 | A1* | 3/2011 | Abe ................ G06F 3/1219 358/1.9 |
| 2012/0075662 | A1* | 3/2012 | Giannetti .......... G06F 3/1217 358/1.15 |
| 2013/0094033 | A1 | 4/2013 | Giannetti et al. |

\* cited by examiner

400

EXAMPLE VARIABLE SIZE
FORMATTING TEMPLATE

| FORMAT 402 | WIDTH 404 | MIN LENGTH 406 | MAX LENGTH 408 | SLATE SIZE 410 |
|---|---|---|---|---|
| 4R | 4 INCHES | 5.33 INCHES | 8 INCHES | 4.75 INCHES |
| 5R | 5 INCHES | 5 INCHES | 8 INCHES | 5 INCHES |
| 8R | 8 INCHES | 6 INCHES | 12 INCHES | 4 INCHES |
| ... | | | | |

FIG. 4

WORK FLOW AND FINISHING FOR PRINT PRODUCTION OF PHOTOGRAPH IMAGES

CROSS-REFERENCE TO RELATED APPLICATION

This application is a Continuation application of and claims priority to U.S. patent application Ser. No. 13/459,666, filed on Apr. 30, 2012 (U.S. Pat. No. 9,025,195, granted on May 5, 2015) and entitled "WORK FLOW AND FINISHING FOR PRINT PRODUCTION OF PHOTOGRAPH," which is hereby incorporated by reference in its entirety.

BACKGROUND

Retail photofinishing has historically involved small scale commercial or even large scale industrial print shops, which rendered captured images onto physical media. Analog photography utilizing photographic film is developed by applying developing chemicals to the photographic film under certain ambient conditions, to make a negative of the film. The negative could then be reduced to re-create a captured photograph on a more permanent media, such as photography paper, or the like.

With the advent of digital photography, film development was replaced by direct printing of digital images. By digitizing an image, the image could be re-created with a dot printer or other suitable printing device on physical media. One great advantage of digital photography is that printers suitable to render a fair to good quality image can be manufactured very cheaply, particularly compared to costs of photographic labs for developing photographic film. Accordingly, digital photography rapidly overtook film-based photography for many applications, particular consumer photography.

Digital photography quickly became a turn-key end-user process, in which the end-user could purchase equipment to digitally capture, store and render their photographs. These digital pictures are easy to share with friends via electronic communication, print out for display, or save for long periods. However, end-user equipment does not achieve the quality that professional printing or finishing can produce, and with recent advancements in high definition photography, the disparity in quality became more pronounced; disparities in printing quality for high definition images are often detectable even by the average photographer. Although commercial photofinishing still provides high quality prints for high definition photographs, the conveniences of printing within one's own home or office are not quite matched by the average retail store experience. Thus, mass consumer use of commercial photofinishing had been somewhat limited. However, Internet commerce has significantly changed this paradigm.

Recent technological advancements in size and cost of data storage, as well as advancements in last-mile Internet bandwidth to the consumer, have enabled web-based photofinishing to flourish. Photographers can now upload digital photographs to a website, and have those images stored for sharing, later viewing, or downloading. Moreover, uploaded photographs can be provided to a commercial printer electronically, with little more manual overhead than printing out a photograph on a digital printer attached to a computer. Photographs, once rendered physically, can be mailed to consumers by the commercial printer. Utilizing electronic communication then, consumers now had access to high quality, high definition printing, with conveniences that approach home digital printing. As a result, much of modern retail photofinishing is directed toward rapidly and cost effectively generating print photographs from electronic digital images.

BRIEF DESCRIPTION OF THE DRAWINGS

FIG. 4 depicts a diagram of an example size formatting for variable size print workflow according to one or more other aspects.

DETAILED DESCRIPTION

Figure 1:
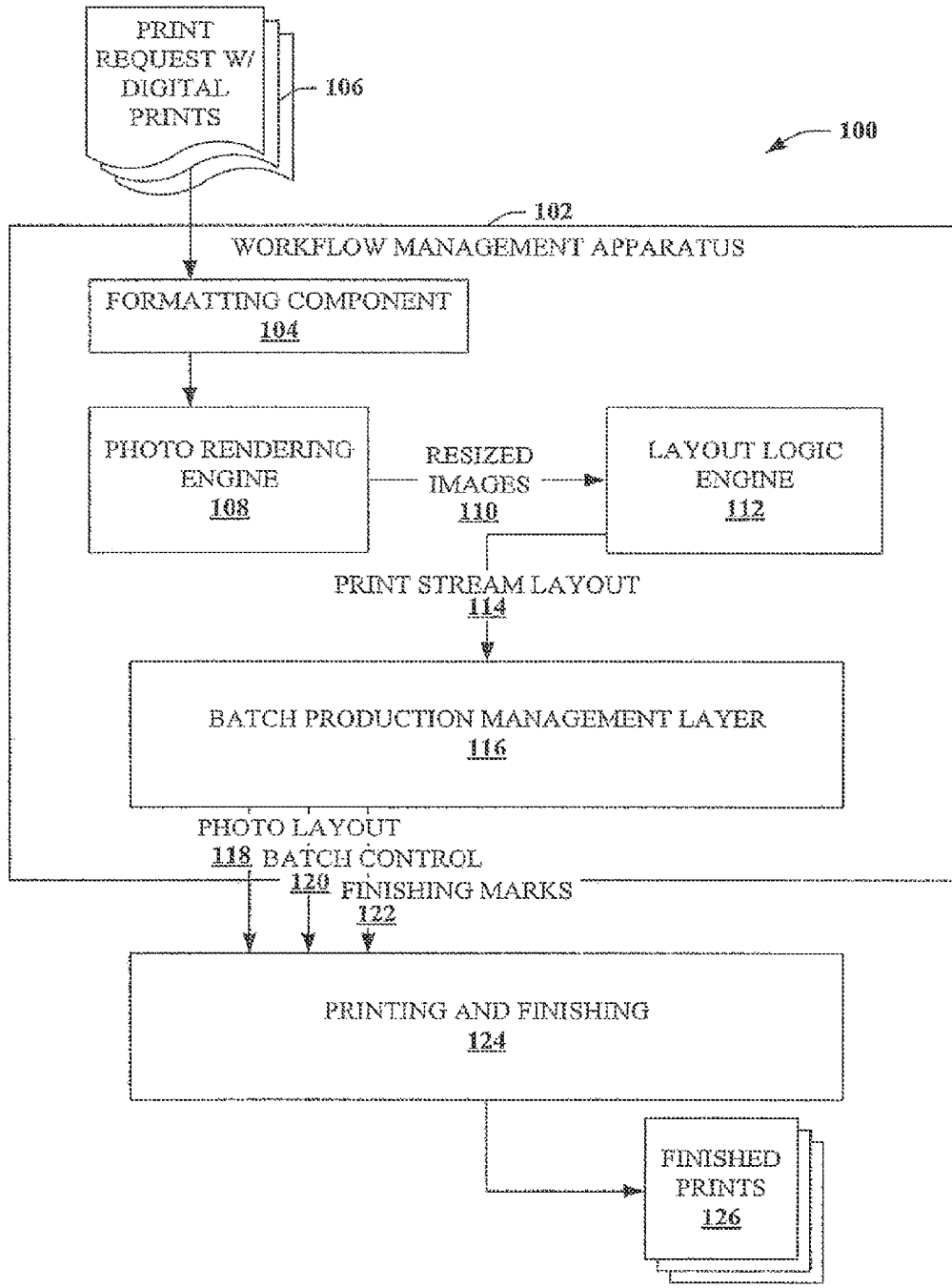
FIG. 1 illustrates a block diagram of an example system to manage workflow related to digital printing according to aspects of the subject disclosure.

One or more implementations of the present disclosure are described with reference to the attached drawings, wherein like reference numerals are used to refer to like elements throughout.

In various aspects of the subject disclosure, a workflow, layout and cutting solution is provided for improving printing technologies. The improvements described herein provide increased productivity and profitability for high-speed printing devices. Moreover, aspects of the subject disclosure can facilitate reduction in environmental impact caused by retail photofinishing printers. By improving productivity and profitability for printers having low environmental impact, these printers can compete with print processes that have higher environmental impact.

Retail photofinishing systems provide retail stores with equipment that facilitates in-house photograph printing services, which in turn can be offered to customers. Essentially, these systems convert digital images provided by consumers into physical form, as photographic rolls or photographic prints. One example of a retail printing process is the silver halide (AgX) print technology, also referred to as a wet technology. Silver halide printing can output high volume, high quality photographs at relatively low cost. Due to the nature of silver halide technology, however, significant amounts of chemicals, water and energy are consumed by these systems. The environmental impact of these processes has become an increasing concern for manufacturers.

Dry photo processing, such as inkjet processing technology, is another example of a retail printing process. Inkjet printing tends to consume fewer chemicals, water and energy, reducing the environment impact of this type of printing technology compared with silver halide printing, as measured by the International Standards Organization (ISO) standards for conducting environmental life cycle assessment (LCA). Some studies have shown a significant reduction in carbon footprint and total energy use for inkjet printing technologies, as compared with wet technologies (e.g., see "Life Cycle Environmental Impact Comparison of Retail Photo Systems", September 2010, n.d., Mar. 31, 2012, http://h71028.www7.hp.com/enterprise/downloads/Exec % 20Summ %20%20HP %20RPS %20LCA % 209%2010%20Europe.pdf). Accordingly, dry photo processing enjoys a distinct advantage over the wet photo processing technology according to these metrics.

The print process solutions disclosed herein provide various improvements for printing and finishing. Software enables grouping and managing bitmap files across wide substrate widths, for maximizing print productivity and profitability. This grouping and managing can also be implemented to minimize substrate waste. More particularly, grouping and managing can include a workflow process that rotates, re-sizes and translates digital images provided by customers into a final print size. The process then arranges re-sized photos into a final layout, densely packing the digital images into predetermined page dimensions, optimizing paper use.

Workflow solutions disclosed in various aspects herein facilitate streamlining of multiple customer orders into a continuous print stream, which can be scheduled for printing at one or more high speed printers. Workflow solutions can accommodate fixed size print frames—in which each frame, or repeat length, of a print stream includes digital images to be printed to a single width and length—as well as variable size print frames—in which a repeat length of the print stream can include images with different lengths. This enables more flexibility in conserving layout for a wide range of customer orders, as well as more flexibility in interfacing with fixed size or variable size print machines.

According to particular aspects of the subject disclosure, printing management can control batch printing across frames/repeat lengths of a print stream. The print management can also specify production finishing marks (e.g., a bar code(s) with pint instructions, an eye-mark(s) for hardware orientation, a chip-out code(s) identifying end of an image, a frame, etc., and so on) and include the finishing marks at predetermined positions within the print stream. A print queue management layer can monitor print resources and govern print scheduling for the print stream consistent with available print resources. Moreover, disclosed hardware enables efficient conversion of wide substrate into "cut to bleed" variable print products.

Batch printing management comprising initiating a particular batch of photographs with a blank image called a slate or header. The slate can carry data in a machine-readable format (e.g., a bar code, . . . ) to facilitate proper printing and finishing. Each frame/repeat length can terminate with a blank area for removal. The blank area can include an eye-mark for orienting print or finishing hardware (e.g., a cutter, . . . ). Example finishing arrangements can include, for instance, a mini-strip comprising multiple photographs in sequence, or individual cuts of photographs, among others. For a mini-strip finishing example, a second set of data in machine-readable format can be placed at the end of a given frame to forecast data (e.g., size, orientation, . . . ) or instructions (e.g., printing instructions, finishing instructions, . . . ) for a subsequent frame that follows the given frame.

In at least one aspect, disclosed finishing solutions can be connected in-line with a print press. Finishing can include a buffer, lamination module, embossing module, decurling module, slitting & gutter module, cutting and shingle or stacking delivery, or a suitable combination thereof. Additionally, waste removal can be integrated for elimination of extraneous paper resulting from slitting, gutter or chip-out finishing operations, blank paper, error pages, or the like.

Disclosed finishing solutions can support multiple print streams of fixed size widths and fixed or variable photo lengths. In particular aspects, fixed size widths can range from 4 inches (4") up to 19.7" or more. In alternative or additional aspects, the variable size lengths can range from 4" to 38" or more. Finished photographs can be output in mini-rolls, comprising strips of adjacent photographs of a selected width, or can be output in individual cuts, or a combination thereof. In still other disclosed aspects, finishing can be implemented in a modular arrangement.

Proposed workflow, printing and finishing solutions provide significant advantages for printing technologies, and particularly for high volume or relatively high volume retail photofinishing. By grouping multiple print streams together onto a print substrate, workflow technologies enable increased productivity for automated printing. Moreover, disclosed aspects that incorporate variable length photos into a print stream provide more customer flexibility, while facilitating tighter packing of digital images within the print streams and reducing wasted print media. Accordingly, the subject disclosure provides for significant improvements in printing technology.

FIG. 1 illustrates a block diagram of an example system 100 to provide workflow management for photographic printing, according to aspects of the subject disclosure. System 100 can be employed to provide improved efficiency, increased production speeds, and reduced material waste (e.g., paper waste) by grouping multiple print requests, or jobs, comprising one or more digital images into a continuous print stream(s), having a wide substrate. Packing algorithms or protocols can be employed to pack digital images densely within the print stream(s), minimizing wasted paper, and increasing profitability of the photographic printing. In at least one aspect, system 100 can convert digital images to a bitmap format for sizing and orienting into the continuous print stream(s), potentially reducing processing overhead involved with the workflow management.

System 100 can comprise a workflow management apparatus 102 configured to manage receipt, compilation and output of respective digital images into a continuous print stream(s) for high volume printing and finishing. Workflow management apparatus 102 can receive a set of print requests 106 comprising sets of digital images. Print requests 106 can comprise a print instruction from a computing device, which includes a set of jobs, and respective digital images per job. A print job, or batch, can comprise an order for a single customer, in one disclosed aspect. However, the subject disclosure is not so limited. In other aspects, a batch can include a plurality of customer orders, for instance up to a predetermined number of digital images per batch. In other aspects, a batch can be independent of customer order, and simply include a number of digital images for printing (e.g., where the number of digital images is related to an input buffer size of workflow management apparatus 102). In particular aspects, a print requests 106 can include a set of electronic orders having respective sets of digital images, received over a network (e.g., see FIG. 2, infra).

In addition to the foregoing, print requests 106 can specify print instructions for a subset of digital images included within print requests 106. Print instructions can include final print size, whether to generate in a roll of prints, or individual cuts, resolution, color, grayscale, black and white, or other suitable size, formatting or graphical parameters associated with printing. Print instructions and digital images can be extracted by workflow management apparatus 102 once received, and compiled based on a suitable data compilation protocol(s). Information identifying a particular request/customer order, group of digital images, or print instructions can be associated with respective digital images for controlling printing and finishing, and for grouping respective orders together.

In a particular aspect of the subject disclosure, workflow management apparatus 102 can comprise a formatting component 104 to convert sets of digital images into bitmap format (e.g., a bitmap file format, or other suitable format that represents an image as a raster plot utilizing a matrix of dots or pixels). The bitmap format can be a compressed format or an uncompressed format. For instance, different types of formats can be specified to meet digital processing, digital memory, or similar parameters of workflow management apparatus 102.

Formatting component 104 outputs bitmap format digital images and related instructions to a photo rendering engine 108. Rendering engine 108 can be configured to geometrically orient or re-orient a subset of the digital images according to print size instructions. For instance, rendering engine 108 can be configured to rotate, re-size and translate digital images. By referencing any associated print instructions, rendering engine 108 can orient digital images into a size and position specified by print instructions, thereby geometrically translating respective digital images into final print size. Where no print instructions are specified, a default print size and orientation can be used, in one aspect, or an error can be issued and the digital image having unspecified instructions can be treated in a default manner (e.g., discarded, printed, printed with default graphic parameters, etc.). Rendering engine 108 provides re-sized digital images 110 to a layout logic engine 112.

Layout logic engine 112 can be configured to orient respective digital images into a continuous print stream. Particularly, re-sized digital images 110 can be respectively positioned within predetermined print media dimensions (e.g., a width of a print substrate). Positioning can be performed with reference to a packing protocol in some aspects, to minimize wasted substrate space, and maximize a number of photographs per unit area of print media. In at least one disclosed aspect, digital images can be positioned within a print stream that is about 13" wide, although the subject disclosure is not so limited, and other size print stream widths can be employed instead. Once image layout is completed, a print stream layout 114, which can comprise a continuous stream of re-sized and oriented digital images (or no digital images, where no orders are received or all received print requests 106 are processed) is output by layout logic engine 112 to a batch production management layer 116.

Batch production management layer 116 receives print stream layout 114 as an input. Batch production management layer 116 can be configured to control batch printing across multiple pages (e.g., frames, repeat lengths, . . . ) of print stream layout 114 (e.g., see FIGS. 3, 8 and 9 infra). In addition, batch production management layer 116 can be configured to specify or add hardware instructions for printing (e.g., eye-mark for equipment positioning, bar code for graphical specifications, . . . ), and production finishing instructions (e.g., cut size, individual cuts or mini-roll, slit size, gutter size, waste areas, . . . ) within print stream layout 114. To facilitate printing and finishing, respective digital images in photo layout 118, batch control information 120, and printing/finishing instructions 122 are output to printing and finishing apparatus 124.

Printing and finishing apparatus 124 can comprise a high volume or relatively high volume printing apparatus, suitable for receiving a flow of digital images and outputting the digital images in a stream of prints. Additionally, printing and finishing apparatus 124 can comprise finishing functionality, to cut respective strips of photographs, or individual photograph cuts, to remove waste media, or apply image enhancing materials, or a suitable combination thereof. In a particular aspect, finishing functionality can be modular. Examples of suitable finishing modules can include a buffer module, a lamination module, an embossing module, a decurling module, a slit and gutter module, a cutting module, and a shingle delivery module. Additionally, printing and finishing apparatus 124 can comprise a waste removal module for removing slitting paper, gutter paper, chip out media, blank paper, error pages, or the like, from printing and finishing apparatus 124 (e.g., see FIGS. 10-13 for more detailed examples of suitable print and finishing modules).

Printing and finishing apparatus 124 outputs finished prints 126. Finished prints 126 can be collected for inspection (e.g., manually, electronically or robotically) or other error control. Once complete, finished prints 126 can be provided in response to print requests 106. As described, system 100 provides turn-key printing from order receipt to finished prints, while minimizing waste media, reducing environmental impact of printing processes, and improving efficiency and production quality, providing significant advantages in printing and finishing technologies.

Figure 2:
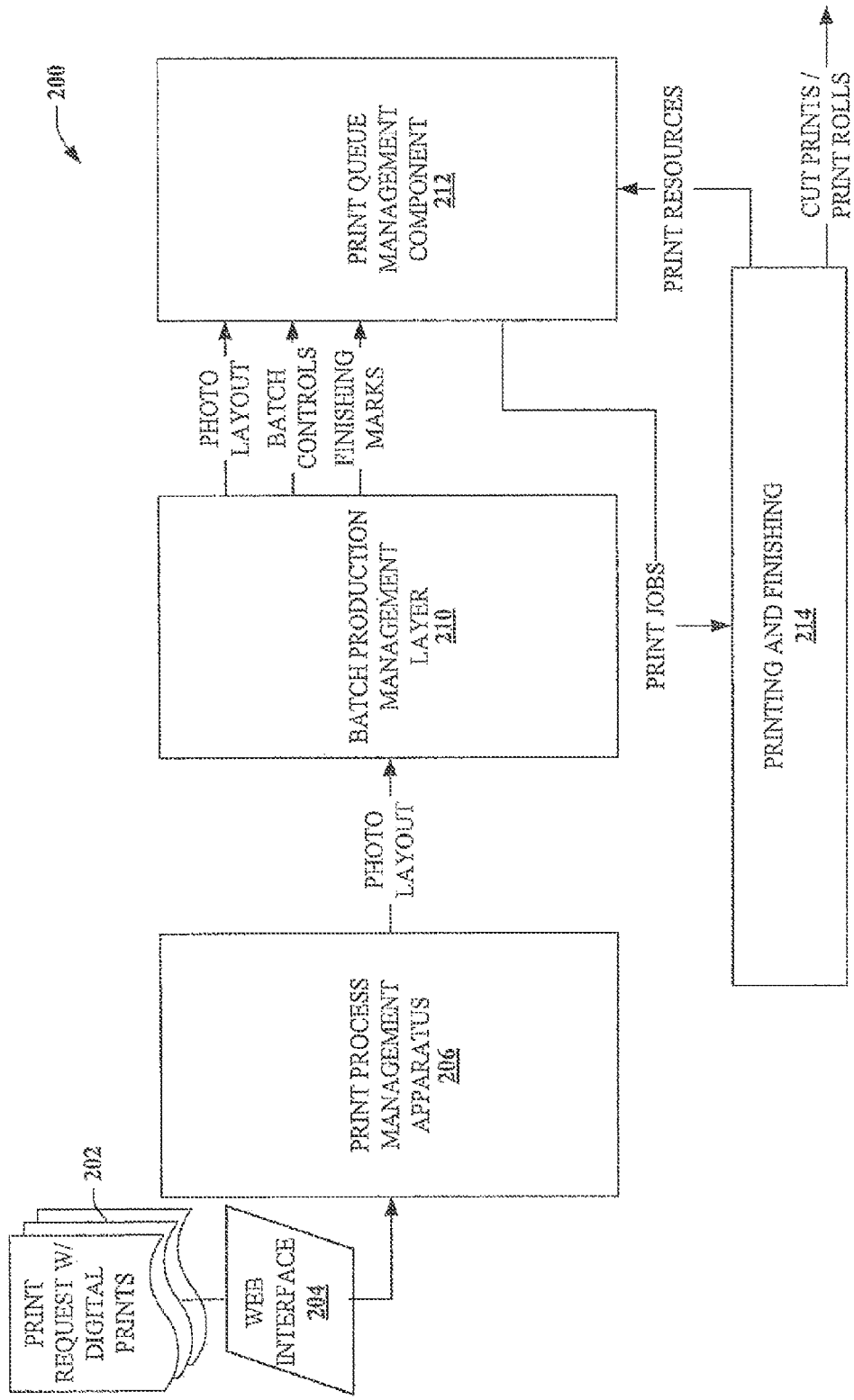
FIG. 2 depicts a block diagram of a sample system to manage network-originated retail photofinishing according to further aspects.

FIG. 2 illustrates a block diagram of an example system 200 according to one or more additional aspects of the subject disclosure. System 200 can provide a turn-key solution for retail photofinishing services in at least one example. In addition, system 200 provides workflow printing techniques to enhance productivity and minimize media waste, improving overall profitability of such services.

System 200 can comprise a web interface 204 that receives digital print requests 202 from a client device interacting with web interface 204. Web interface 204 can be configured, for instance, to receive printing specifications, digital images and graphical, printing or finishing instructions for subsets of the digital images. For instance, web interface 204 can be configured to receive a number of digital images within a print request 202, and to receive uploaded digital image files in a suitable file format(s). Web interface 204 can display selections for various graphical, print and finishing parameters for each uploaded digital image. Suitable parameters can include, but are not limited to, photo size, photo orientation (e.g., landscape, portrait, panorama, . . . ), print media type (e.g., type of paper), photo resolution, black and white, grayscale and grayscale resolution, color and associated color scheme or number/resolution of colors, finishing features such as glossy or flat finish, decurling, embossing, lamination, and so on, print process (e.g., inkjet process, silver halide process, liquid electro-photographic process, . . . ), or other pertinent parameters, or suitable combinations thereof. Web interface 204 receives the set(s) of uploaded digital images, and associated print instructions, and provides the set(s) of digital images and print instructions to a print process management apparatus 206.

In at least one aspect of the subject disclosure, web interface 204 can receive print requests 202 as inputs, and provide processed digital images and instructions as outputs, as a real-time or near real-time continuous process. Thus, where a sufficient rate of print requests 202 are received, web interface 204 can generate a continuous flow of digital images and related instructions as outputs to print process management apparatus 206. Flow of digital images and related instructions can be considered part of workflow operations of system 200, or a separate process.

Print process management apparatus 206 can be configured for re-sizing a subset of received digital images per size specifications included in associated print instructions. In addition, print process management apparatus 206 can be configured to orient re-sized digital images within a suitable substrate dimension (e.g., substrate width) of print media employed by system 200. Thus, for instance, re-sized images can be positioned within the substrate dimension according to a best-fit protocol that maximizes image packing within the substrate. Sizing and orientation of digital images can result in a stream of photographs of fixed length per page, or of variable length per page, which can be output as a continuous print stream photo layout to a batch production management layer 210.

It should be appreciated that, where the term continuous print stream is utilized herein, the term continuous implies that digital images can be sized, oriented and positioned relative to a movable substrate dynamically and sequentially in real-time to provide a flow of digital images for printing. However, the term is not intended to imply no gaps in the flow might occur. For instance, where insufficient numbers of digital images have been received to fill the print stream substrate at a given time, or where packing constraints, photograph boundaries or the like result in gaps in images on a substrate, a continuous print stream can still be satisfied. Thus, continuous can refer to the capacity to provide a flow of digital images for printing, as an alternative or in addition to filling or substantially filling a print area of a moving print substrate at a given point in time.

Batch production management layer 210 can be configured to include batch controls, and finishing instructions for printing and finishing the digital images within the print stream. Batch controls for the start of a batch can be included in a slate or header, for instance, within a bar code or other machine-readable data format. The slate can be positioned within the continuous print stream, ahead of digital images associated with the batch. End of frame marks can, in some aspects, be included in an end of frame slate, also within a bar code or other machine-readable data format. Finishing marks can be included frame by frame in the bar code(s) as well.

As outputs, batch production management layer 210 provides the stream of images in the photo layout, and the related batch controls and finishing marks to a print queue management component 212. Print queue management component 212 can be configured for monitoring dynamic print resources of a printer (not depicted, but included within printing and finishing 214). Additionally, print queue management component 212 can be configured for controlling print scheduling of digital images consistent with available print resources of the printer. Print queue management component 212 can store received digital images, controls and instructions in memory, where necessary, to suitably govern the flow of images sent to printing and finishing 214. As available print resources decrease, for instance, more digital images and associated information can be stored in temporary memory; and when available print resources increase, fewer digital images and associated information are stored in temporary memory, and are scheduled upon receipt for printing and sent to printing and finishing 214.

Finished prints, in rolls or cuts, or both, are output by printing and finishing 214. Various finishing effects can be implemented, as described herein in more detail (e.g., see FIGS. 10-13, infra). Finished prints can be sent for shipping to respective consumers submitting respective print requests 202 at web interface 204, in one aspect, resulting in a true consumer—retailer—consumer turn-key printing solution.

Figure 3:
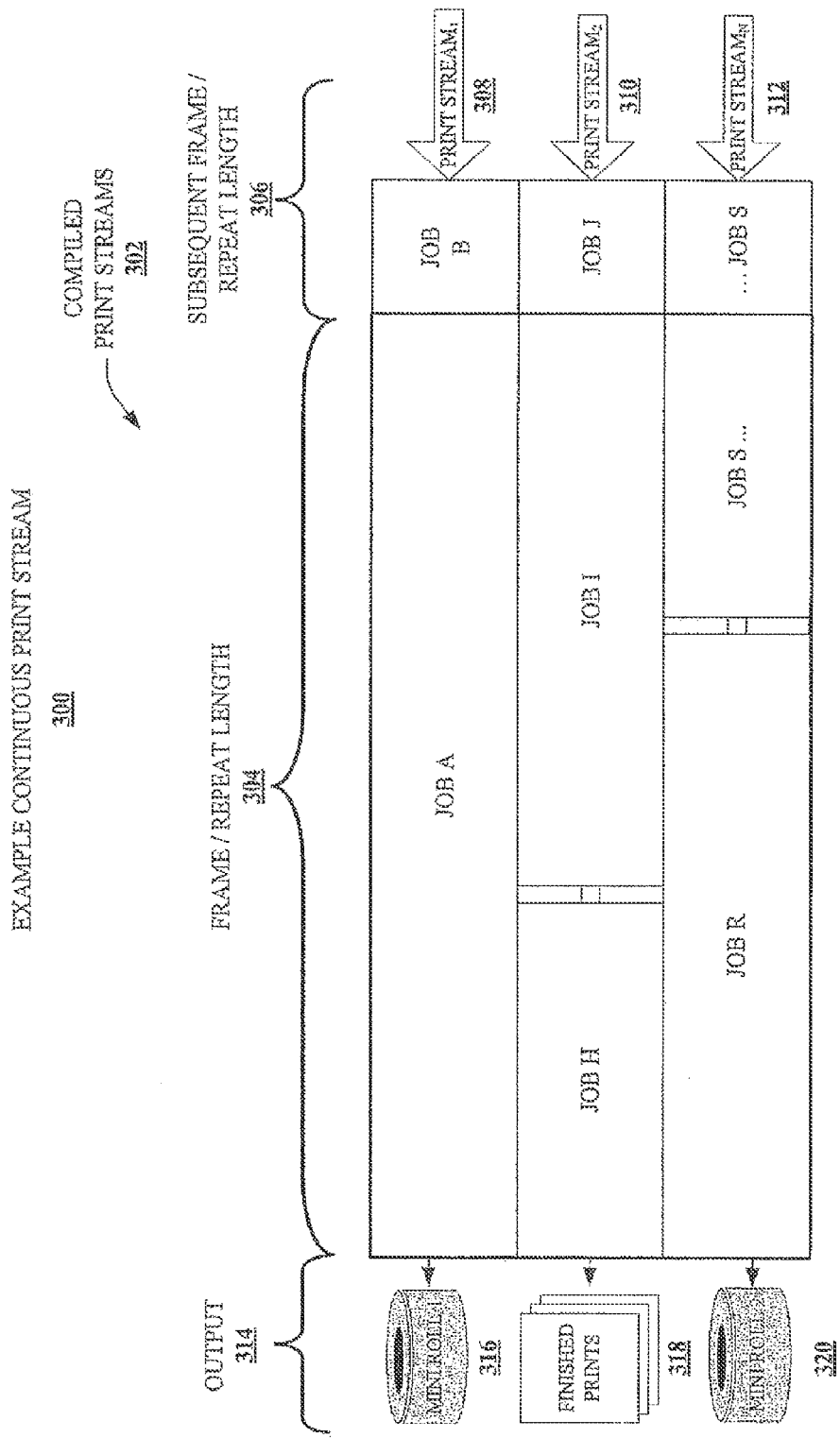
FIG. 3 illustrates a block diagram of an example print stream to group separate print requests into a continuous print stream, according to other aspects.

FIG. 3 illustrates a block diagram of an example continuous print stream 300 according to aspects of the subject disclosure. Print stream 300 includes one full frame/repeat length 304 (referred to hereinafter in regard to print stream 300 as a repeat length 304), and a start of a subsequent repeat length 306. Print stream 300 is depicted as a compilation of individual print streams 302 (referred to as compiled print streams 302), including print stream$_1$ 308, print stream$_2$ 310, through print stream$_N$ 312 (referred to collectively as print streams 308-312), where N is a suitable positive integer. Generally a number of print streams 308-312 that can be included in a compiled print stream 302 is governed by a width of compiled print stream 302 (e.g., 10 inches, 12 inches, 13 inches, 15 inches, . . . ), which in turn is generally governed by a width of a substrate employed for printing. As depicted, compiled print streams 302 includes three different print streams 308-312. In the case where compiled print streams 302 have a width greater than 12 inches, print streams 308-312 can be a 4 inch wide, or 4R format print stream (e.g., see FIG. 5, infra).

Print stream$_1$ 308 comprises two jobs, or batches, job A which fills repeat length 304, and job B which begins at the start of subsequent repeat length 306. Print stream$_2$ 310 includes three batches, particularly job H which comprises a fraction of repeat length 304, and job I which fills a remainder of repeat length 304. Additionally, print stream$_2$ 310 includes job J, which beings at the start of subsequent repeat length 306. Print stream$_N$ 312 includes job R, which fills a different fraction of repeat length 304 from job H, and Job S, which fills a remainder of repeat length 304 for print stream$_N$ 312, and continues in subsequent repeat length 306.

Thus, as print streams 308-312 illustrate, a batch fill an entire repeat length (e.g., job A), or a portion thereof (e.g., job H, I, R), and can be contained entirely within a single repeat length (e.g., job A, H, I, R), or can be spread over multiple repeat lengths (e.g., job S).

Each of print streams 308-312 include respective sets of digital images (not depicted) sized to fit a width of the respective print stream, and of fixed or variable length, depending on a constraint imposed on the print streams. As described herein, these digital images can be oriented within the print streams as needed to increase packing of repeat length 304 and minimize media waste.

Output 314 of each print stream comprises physical prints in one of a set of available output forms. As depicted, finishing for respective print streams 308-312 can be handled differently. Print streams 308 is finished as a first mini-roll 316, print stream$_2$ 310 is finished as a set of individual cut photographs, and print streams 320 is finished as a second mini-roll 320.

FIG. 4 depicts a diagram of a sample formatting chart 400 for example workflow print stream formats according to particular aspects of the subject disclosure. Formatting chart 400 depicts print stream repeat length characteristics along a top row of formatting chart 400. Listed characteristics include format name 402, print stream width 404, minimum image length 406, maximum image length 408, and slate size 410. Starting with the second row is listed an example 4R print stream format, having the following characteristics: 4 inch width, minimum photograph length of 5.33 inches, maximum photograph length of eight inches, and slate size of 4.75 inches. At the third row an example 5R format is listed, having the following characteristics: 5 inch width, minimum photograph length of 5 inches, maximum photograph length of eight inches, and slate size of 5 inches. At the fourth row an example 8R format is listed, having the following characteristics: 8 inch width, minimum photograph length of 6 inches, maximum photograph length of 12 inches, and slate size of 4 inches.

It should be appreciated that formatting chart 400 is but one example of possible print stream formats. Other suitable formats having other repeat length characteristics can be implemented in conjunction with various aspects of the subject disclosure as well. FIGS. 5-9, infra, illustrate more detailed print stream repeat lengths based on these or similar example formats.

Figure 5:
FIG. 5 illustrates a diagram of a sample organization of a continuous print stream with a three-up, fixed length repeat frame, in some aspects.

FIG. 5 illustrates a diagram of an example fixed size layout 500 for a print stream repeat length, according to additional disclosed aspects. Fixed size layout 500 comprises a 4R format, which can include print streams of 4 inch width and a total repeat length of 980 mm. The fixed size layout, as compared with a variable size layout (e.g., see FIGS. 8-9), comprises photographs having a common width and a common length, in this case 4 inches by 6 inches. As depicted, a print stream comprises a sequence of photographs 4 inches wide, and 6 inches in length. Three separate print streams are grouped together in the 4R format to form a compiled print stream 502. As such, the fixed sized layout 500 can also be referred to as a 3 up—4"×6" format (three compiled print streams comprising 4 inch by 6 inch images).

Each of the three separate print streams form a respective print stream row 506 of compiled print stream 502. Adjacent images of different print stream rows 506 form an image column 504. Fixed size layout 500 has an overall width of 330 millimeters (mm), a maximum printing width of 317 mm, and a combined image width of 304.8 mm. The maximum web width includes a slitting layer 8.6 mm wide at the top and bottom of fixed size layout 500. The slitting layers can be removed in a finishing operation from a final print output comprising a min-roll(s) of photographs or individual cuts of photographs. In addition, a 4 mm gutter layer between adjacent print stream rows 506 is indicated. The gutter layers can also be removed in a finishing operation from final print outputs.

Additionally, several control slates 508 are interspersed throughout compiled print stream 502. Control slates 508 can indicate a start of a new batch of photographs (e.g., see FIG. 3, supra) for a given print stream row 506. A magnified view of a control slate 508A is depicted above compiled print stream 502. Magnified control slate 508A shows example components of respective control slates 508. A job slate header 510 indicates the start of a new batch of images, and can include marketing information, identifying a new batch of images. The marketing information can also include instructions for one or more advertisements which can be included with finished cuts or mini-rolls of the new batch of images. In addition, control slates 508 can include a bar code 512 or other machine-readable data format that includes printing or finishing instructions for batch images, and an eye-mark 514 for aligning print or finishing hardware (e.g., a print head, a cutter, . . . ). Magnified control slate 508A also illustrates a chip-out code 516, which also can be a machine-readable data format such as a bar code, indicating an end of a particular slate, in this case a control slate. Chip-out codes 516 can also be included at an end of each image, indicating an end of a particular image and a start of a new image. In at least one aspect of the subject disclosure, an additional chip-out code can be included at the start of a control slate 508, to differentiate a following control slate from an image.

Figure 6:
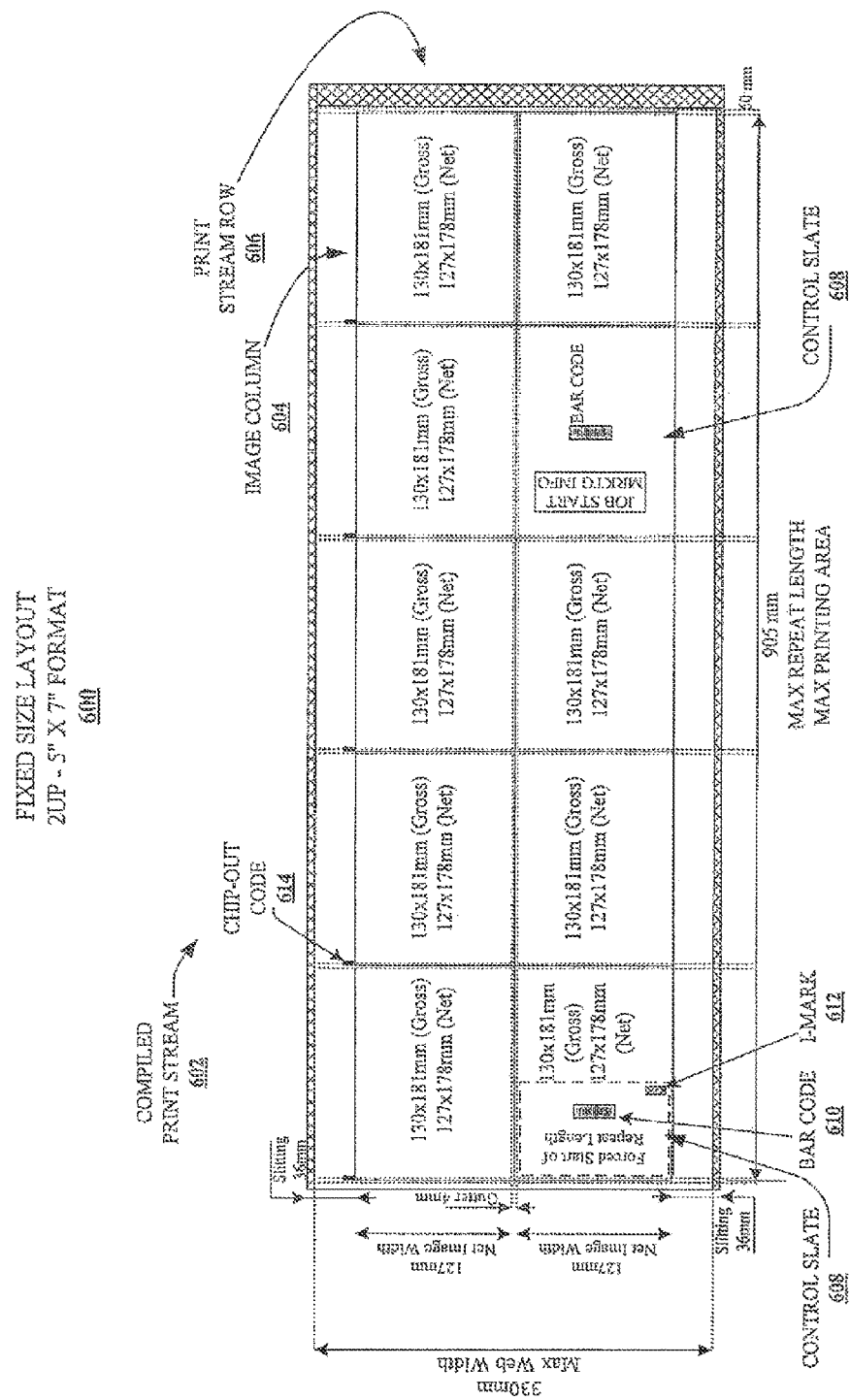
FIG. 6 depicts a diagram of a sample organization of a continuous print stream with a two-up, fixed length repeat frame, in other aspects.

FIG. 6 illustrates a diagram of an example fixed size layout 600 having a 5R format according to additional aspects of the subject disclosure. Fixed size layout 600 can also be referred to as a 2 up 5"×7" format, indicating that fixed size layout 600 comprises two print stream rows 606 having 5 inch by 7 inch digital images. The two print stream rows 606 form a compiled print stream 602. The compiled print stream 602 has a maximum web width of 330 mm, and respective net image widths of 127 mm with a 4 mm gutter there between. These dimensions leave about 36 mm at a top and bottom of fixed size layout 600 for slitting.

Adjacent images in respective print stream rows 606 form an image column 604, separated by the 4 mm gutter layer. Control slates 608 can indicate a forced start of a repeat length for fixed size layout 600, or a start of a new batch, or both. A bar code 610 included in respective control slates 608 indicates printing or finishing instructions for images within a particular batch, and an eye-mark 612 provides a positioning or orientation reference for printing or finishing hardware. Respective chip-out codes 614 can be positioned in a space between images, or between an image and a control slate of a print stream row 606, indicating the end of a particular image or slate, and the start of a new image or slate. A maximum repeat length for fixed size layout 600 is 905 mm.

Figure 7:
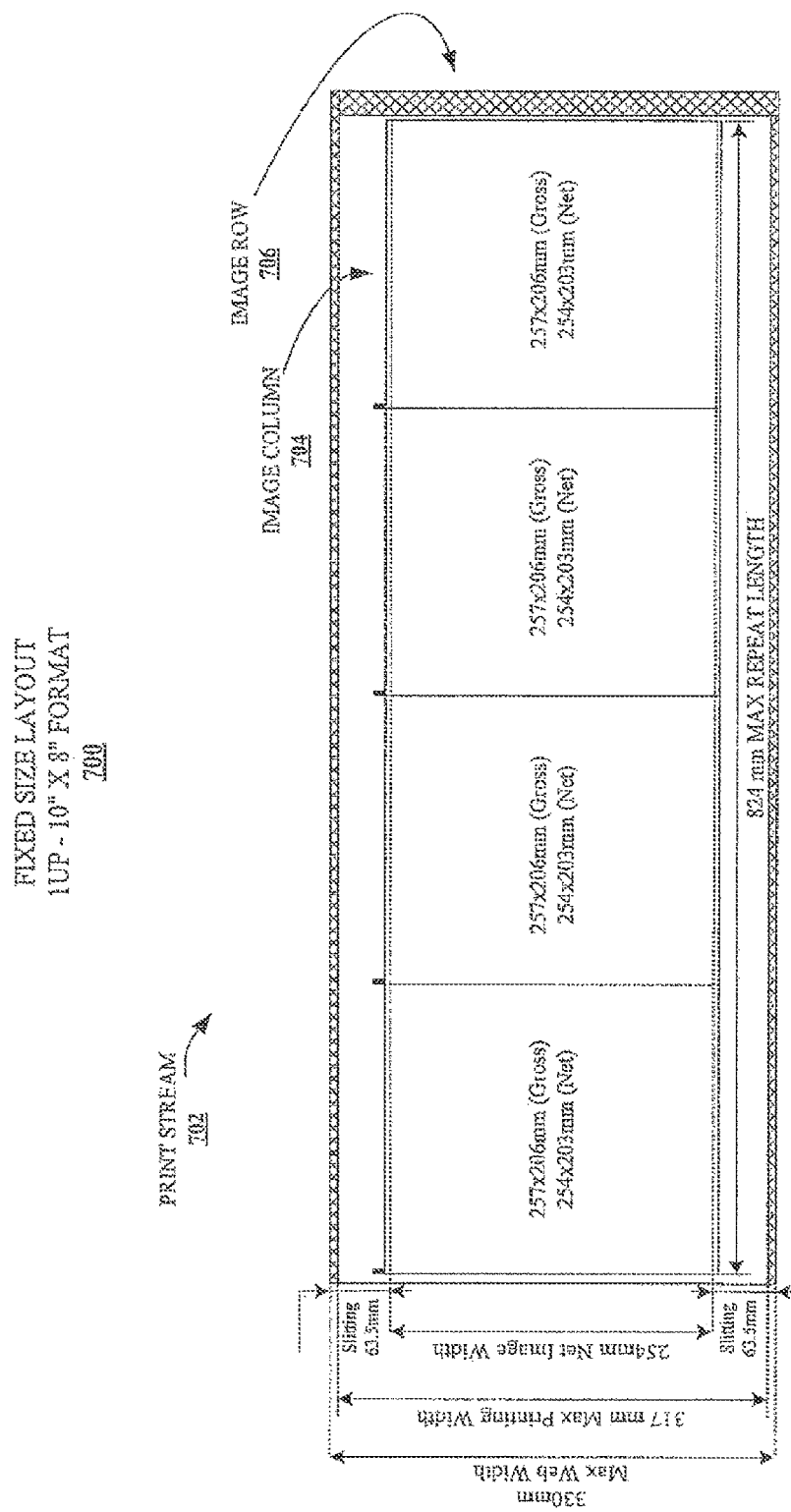
FIG. 7 illustrates a diagram of an example organization of a continuous print stream with a one-up, fixed length repeat frame, in yet other aspects.

FIG. 7 illustrates a diagram of an example fixed size layout 700 according to still other aspects disclosed herein. Fixed size layout 700 is a 1 up 10"×8" format, having a single print stream 702 of 10 inch by 8 inch digital images and a maximum repeat length of 824 mm. Print stream 702 comprises a single image row 706 with a single digital image per image column 704. As depicted, fixed size layout 700 can comprise a maximum web width of 330 mm, with a 317 mm maximum printing width and 254 mm net image width. A top and bottom slitting layer of 63.5 mm can be removed during finishing. Although not depicted, a control slate can be included within fixed size layout 700, similar to those depicted at FIGS. 5 and 6, supra. The control slate can specify a start of a repeat length or a start of a new batch, as well as printing or finishing instructions in machine-readable data format, an eye-mark for orienting print or finishing hardware, and a chip-out code identifying an end (or beginning) of the control slate. Additionally, chip-out codes can be positioned between respective images of print stream 702, identifying an end of one image and a start of another image or control slate.

Figure 8:
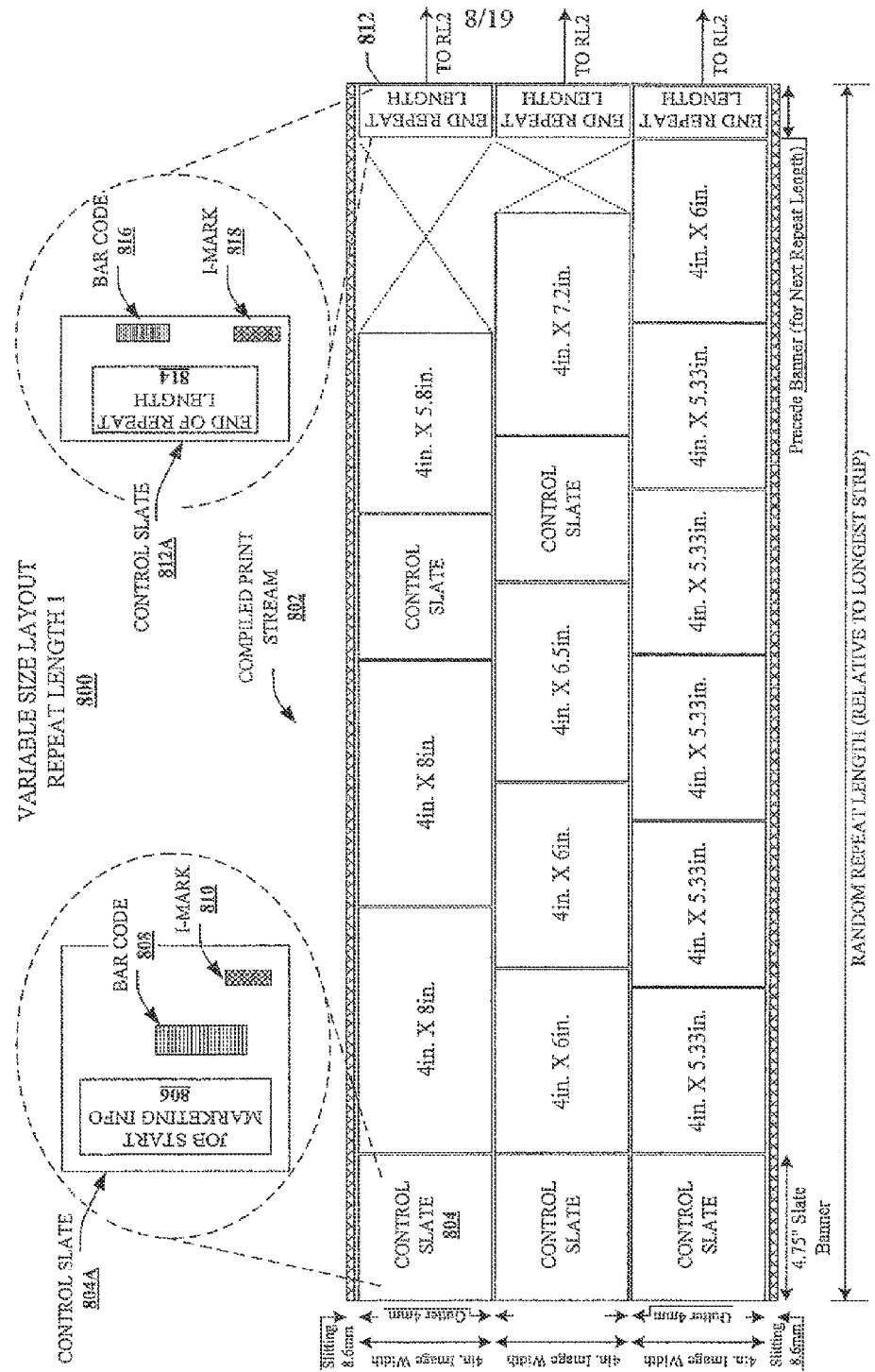
FIGS. 8 and 9 depict a diagram of an example variable length print stream comprising two repeat frames, according to additional disclosed aspects.
Figure 9:
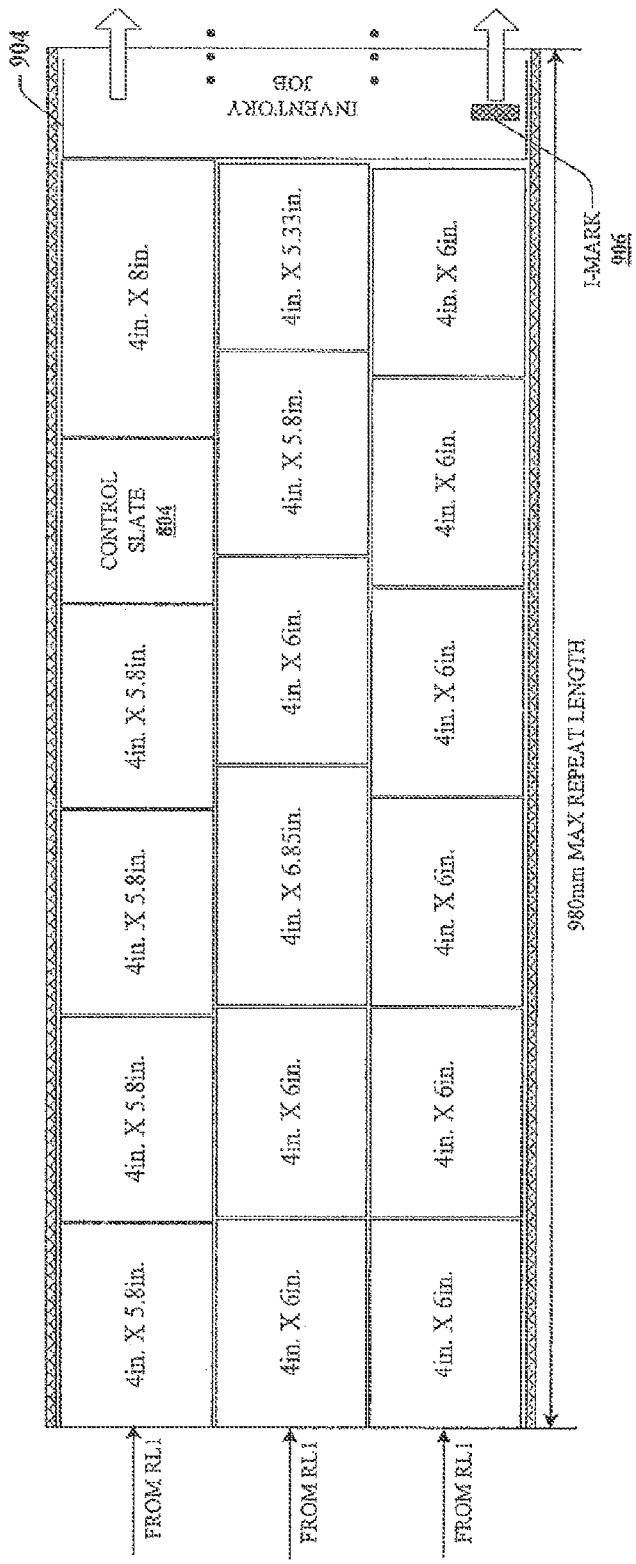

FIGS. 8 and 9 depict a block diagram of an example variable size layout according to additional aspects of the subject disclosure. The variable size layout is in a 4R width format, although other formats (e.g., 5R, 6R, 8R, 10R, . . . ) can be employed as well for a suitable variable size layout. Referring first to FIG. 8, a first repeat length 800 of the variable size layout is depicted. First repeat length 800 comprises a compiled print stream 802 that includes three individual print streams grouped within a maximum web width of the compiled print stream 802. Compiled print stream 802 begins on a left side of the figure with respective control slates 804 heading each of the three print streams. A magnified control slate 804A is depicted, indicating example components of the respective control slates 804. As depicted, magnified control slate 804A can include job start and marketing information 806 identifying a batch of images pertinent to a particular job, a bar code 808 with print or finishing instructions for images within the job, and an eye-mark 810 for orienting print or finishing hardware. Although not depicted, a chip-out code can be included at an end of a control slate 804, identifying the end of the control slate and start of an image within a given print stream.

Each of the print streams includes digital images of 4 inches in width, and having varying lengths. For instance, the top print stream has a 4.75 inch long control slate, which identifies a job that includes an 8 inch long digital image, and a second 8 inch long digital image. A subsequent control slate identifies the start of a new job, which includes a 5.8 inch long digital image. The subsequent control slate can also identify a total number of images in the new job, which can include images within repeat length 2 900 of FIG. 9, infra. The second print stream in the middle row of compiled print stream 802 starts at the left with a control slate that identifies a job having three digital images, a first of 6 inches in length, a second of 6 inches in length, and a third of 6.5 inches in length. A second job is identified by a subsequent control slate in the second print stream, identifying a number of digital images which includes a 7.2 inch long image, as well as a set of images within the second print stream of repeat length 2 900. The third print stream in the bottom row of compiled print stream 802 begins with a control slate followed by five images of 5.33 inches in length, and an image of 6 inches in length.

Each print stream of compiled print stream 802 includes an end repeat length slate 812 at the end of repeat length 1 800. End repeat length slate 812 is magnified at control slate 812A, depicting example components of end repeat length slate 812. These components can include an end of repeat length marker 814 identifying an end of repeat length 1 800. Additionally, a bar code 816 can provide information about a start of repeat length 2 900 of FIG. 9, including whether a first slate of a given print stream within repeat length 2 is a new job, or a continuation of a job from repeat length 1 800. In some aspects, the bar code 816 can identify a number of digital images that carry over from the job beginning in repeat length 1 800, or can identify a number of digital images within a new job starting at repeat length 2 900, as appropriate. Bar codes 816 can also identify print or finishing instructions for the digital images within repeat length 2 900 associated with a particular job. Control slate 812A can also include an eye-mark 818 for positioning print or finishing hardware.

Referring now to FIG. 9, a second repeat length, repeat length 2 900 of the variable size layout is illustrated. Each of three print streams in a compiled print stream 902 continue a job from repeat length 1 800 of FIG. 8. Additionally, the print streams terminate at a right side of repeat length 2 900 with an inventory job 904 (also referred to herein as an end of roll inventory job). Inventory job 904 can include identification information for a roll of photographs. In at least some aspects, inventory job 904 can further include respective lists of jobs on the respective rolls. Further, inventory job 904 can also comprise an eye-mark 906 for synchronizing cutting and slitting equipment. Inventory job 904 can be printed at an end of a roll of jobs and photographs, and can be configured to terminate a printed roll of photographs. Inventory job 904 is generally at the outside or end of a roll to be visible to an operator before finishing, and can be removed as part of a slitting operation, for instance.

In at least some aspects of the subject disclosure, inventory job 904 can be one or more repeat frames in length, continuing beyond repeat length 2 900 depicted at FIG. 9 (represented by the arrows extending to the right of repeat length 2 900). In one aspect, information included within inventory job 904 can begin within the region depicted for inventory job 904 at the end of repeat length 2, whereas in another aspect, only eye-mark 906 is included in the region depicted for inventory job 904, and the information included within inventory job 904 is printed on a subsequent repeat length(s) following repeat length 2 900. Inventory job 904 can also include one or more blank repeat lengths for spacing, making inventory job 904 more noticeable to an operator. As mentioned above, an inventory job terminating a roll of photographs such as inventory job 904 can also be referred to as an end of roll inventory job, so as to be distinguished from an inventory job (or control slate 804) that initiates a repeat length or terminates a job of photographs within a repeat length, such as the control slates 804 of compiled print stream 802 of FIG. 8. This latter inventory job/control slate can include information specified at magnified control slate 804A pertaining to a particular job, generally for variable size jobs. The end of roll inventory job 904, on the other hand, can be employed for fixed or variable size rolls of photographs, and include information pertaining to a set of jobs within a roll of photographs, respective jobs within the set of jobs, respective photographs within respective ones of the set of jobs, and so on.

With further reference to FIG. 9, a first print stream at the top of repeat length 2 900 comprises four consecutive 5.8 inch long digital images, followed by a control slate 804 indicating a new job, that includes at least one 8 inch long image (and may include other images in a third repeat length, not depicted). The second print stream in the middle of compiled print stream 902 comprises two 6 inch long images, a 6.85 inch long image, another 6 inch long image, a 5.8 inch long image and a 5.33 inch long image. The third print stream at the bottom of compiled print stream 902 comprises six consecutive 6 inch long images. Similar to repeat length 1 800, repeat length 2 900 terminates with an end of repeat length slate 812 for each of the print streams, performing a similar function as the end of repeat length slates 812 of repeat length 1 800.

Note that end of repeat length slates 812 can perform the function of control slates 804 for the start of a subsequent repeat frame, obviating a need for additional control slates 804 at the beginning of the subsequent control frame. Thus, compiled print stream 902 of repeat length 2 900 does not include control slates at the beginning of repeat length 2 900; that function is performed by end of repeat length slates 812 that terminate repeat length 1.

It should be appreciated that other print stream formats can be implemented with a variable size layout, similar to the variable size layout of FIGS. 8 and 9. These formats can include more or fewer print streams within a compiled print stream. For instance, utilizing the 5R print stream format depicted in fixed size layout 500 of FIG. 5, a related variable size layout can comprise two compiled print streams each of 5 inches print width. Alternatively, for a wider maximum web width of greater than fifteen inches, a 5R variable size layout can comprise three compiled print streams each of 5 inches print width, and so on. Likewise, other print formats can be implemented in variable size format (or fixed size format), having differing numbers of print streams depending on a width of the format and maximum web width employed. FIGS. 5-9 depict a maximum web width of 330 mm, which corresponds with a 13 inch substrate. Wider or narrower substrates can be configured to include more or fewer print streams, depending on format, as dimensions allow.

Figure 10:
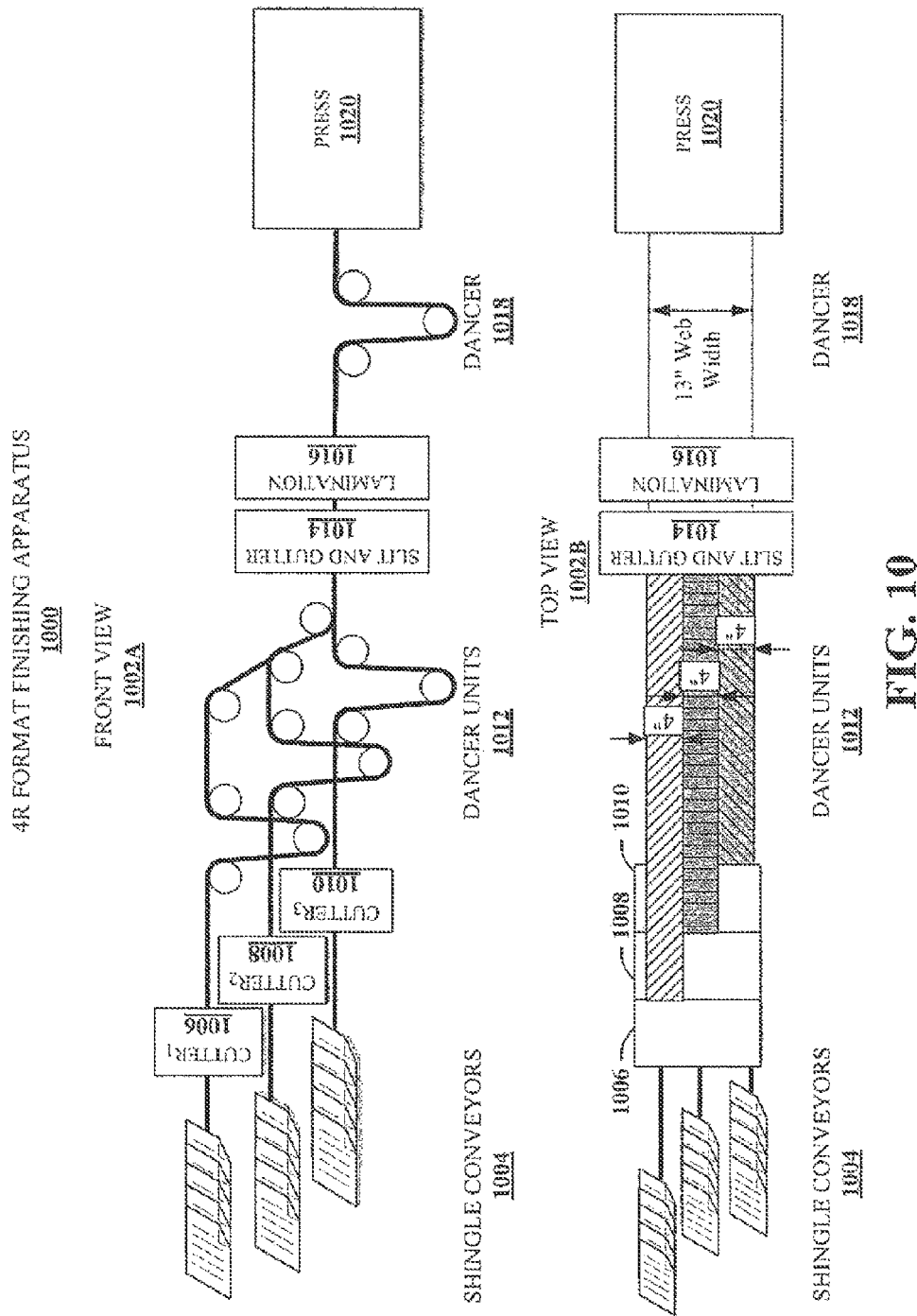
FIG. 10 illustrates a block diagram of an example cutting and finishing apparatus for three-up photo finishing, according to additional aspects of the disclosure.

FIG. 10 illustrates a block diagram of an example finishing apparatus 1000 according to other aspects of the subject disclosure. Finishing apparatus 1000 is configured for a 4R format print layout, and can operate on a fixed size layout (fixed length photographs) or a variable size layout (variable length photographs). A web width of 13 inches is illustrated for finishing apparatus 1000, with three separate print streams of 4 inch width, although other size web widths and print stream formats can be accommodated with suitable dimension adjustments.

Finishing apparatus 1000 is depicted in a front view 1002A and a top view 1002B. Starting with front view 1002A, a set of shingle conveyers 1004 deliver print media to a series of adjacent cutters, including a first cutter 1006, a second cutter 1008 and a third cutter 1010 (referred to collectively as cutters 1006-1010). Cutters 1006-1010 are positioned to separate adjacent streams of print media and output three separate print media streams. The streams of print media are then conveyed separately by dancer units 1012 and provided to a slit and gutter module 1014 and lamination module 1016. Slit and gutter module 1014 removes slit layer media and gutter layer media around the print media streams, and lamination module 1016 laminates the streams. A final dancer 1018 feeds the finished photographs to a press 1020.

Referring to top view 1002B, orientation of compiled print streams in a 13 inch web width can be viewed. The 13 inch web width is fed by shingle conveyers 1004 to cutters 1006-1010, which separate the compiled print streams in the 13 inch web width to three separate 4 inch wide print streams. These separate print streams are conveyed by dancer units 1012 to slit and gutter module 1014 and lamination module 1016. As depicted, the 13 inch width of the three separate print streams is substantially maintained by dancer units 1012, slit and gutter module 1014, lamination module 1016 and dancer 1018, and received in this orientation by press 1020.

Figure 11:
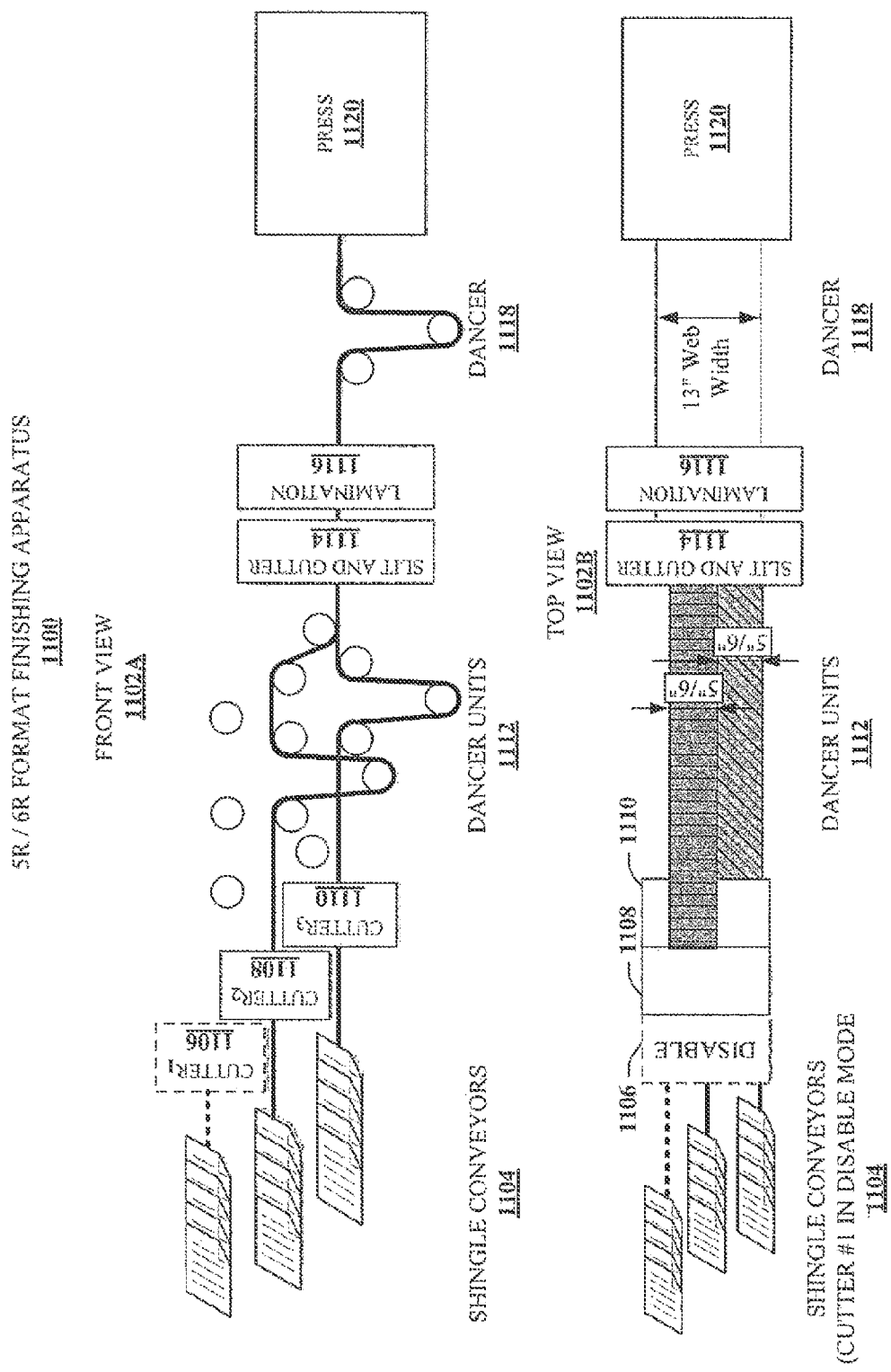
FIG. 11 depicts a block diagram of a sample cutting and finishing apparatus for two-up photo finishing, according to one or more further aspects.

FIG. 11 illustrates a block diagram of a finishing apparatus 1100 configured for a 5R or 6R print stream format. In at least one aspect of the subject disclosure, finishing apparatus 1100 can be similar to finishing apparatus 1000, except as described below. For instance, finishing apparatus 1100 can comprise similar hardware units and positions, with one or more hardware units disabled, and adjustments made for width of the 5R or 6R print stream widths.

Front view 1102A of finishing apparatus 1100 comprises shingle conveyers 1104 which feed two print streams on a media substrate to a series of cutters, a first cutter 1106, a second cutter 1108 and a third cutter 1110 (referred to collectively as cutters 1106-1110). First cutter 1106 is disabled (indicated by dashed lines), as the compiled print stream comprises two adjacent print streams, as opposed to three adjacent print streams as depicted in the 4R format of finishing apparatus 1000. Accordingly, second cutter 1108 and third cutter 1010 separate the two print streams by cutting the media substrate, and dancer units 1112 convey the separated print streams to a slit and gutter module 1114 that removes media material in a slit layer and gutter layer of the respective print streams, and a laminating module 1116 that laminates the media of the print streams. A dancer 1118 then delivers the print streams to a press 1120. Referring to top view 1102B, cutters 1106-1110 receive the compiled print stream from shingle conveyers 1104, and output two separate print streams of 5 inch or 6 inch width, respectively, in a substantially same orientation as the compiled print stream (e.g., side-by-side). The separated print streams maintain substantially the same orientation within the 13 inch web width after cutting by cutters 1108 and 1110 as before.

Figure 12:
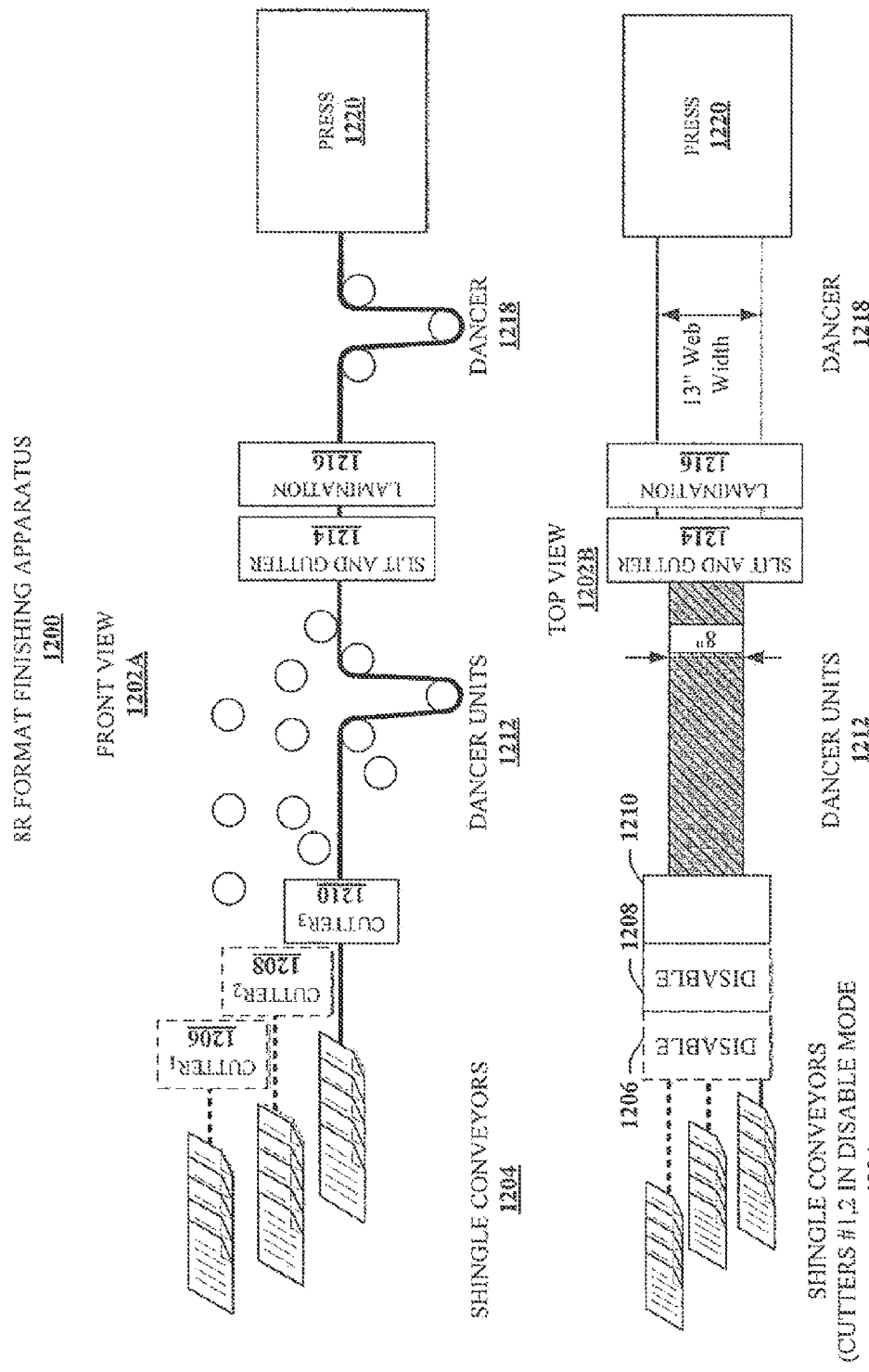
FIG. 12 depicts a block diagram of a sample cutting and finishing apparatus for one-up photo finishing, in yet other aspects.

FIG. 12 depicts a block diagram of an example finishing apparatus 1200 configured for an 8R or larger print stream format. Thus, although an 8R print stream format is depicted, a larger format, such as a 10R, 12R, . . . , format can be substituted for the 8R print stream format with similar operation. A front view 1202A of finishing apparatus 1200 illustrates a print stream fed to a series of cutters, including a first cutter 1206, a second cutter 1208, and a third cutter 1210 (referred to collectively as cutters 1206-1210) by shingle conveyers 1204. In the 8R or larger format on a 13 inch substrate, a single print stream is provided to cutters 1206-1210. Thus, first cutter 1206 and second cutter 1208 can be disabled, and cutter 1210 can be utilized to remove non-print media outside of a width of the print stream. Dancer units 1212 convey the remaining print media comprising the print stream to a slit and gutter module 1214 and lamination module 1216, which can be substantially similar to those described above at FIGS. 10 and 11. Finally, a dancer 1218 feeds a laminated print stream with non-printable media removed (e.g., by third cutter 1210 and slit and gutter module 1214) to a press 1220. Top view 1202B illustrates disabled first cutter 1206 and second cutter 1208, and an orientation of the single print stream, 8 inches wide, after some non-print media is removed by third cutter 1210. As depicted, the print stream can be maintained in its original orientation relative to the 13 inch wide web width by dancer units 1212 and 1218, prior to delivery to press 1220.

Figure 13:
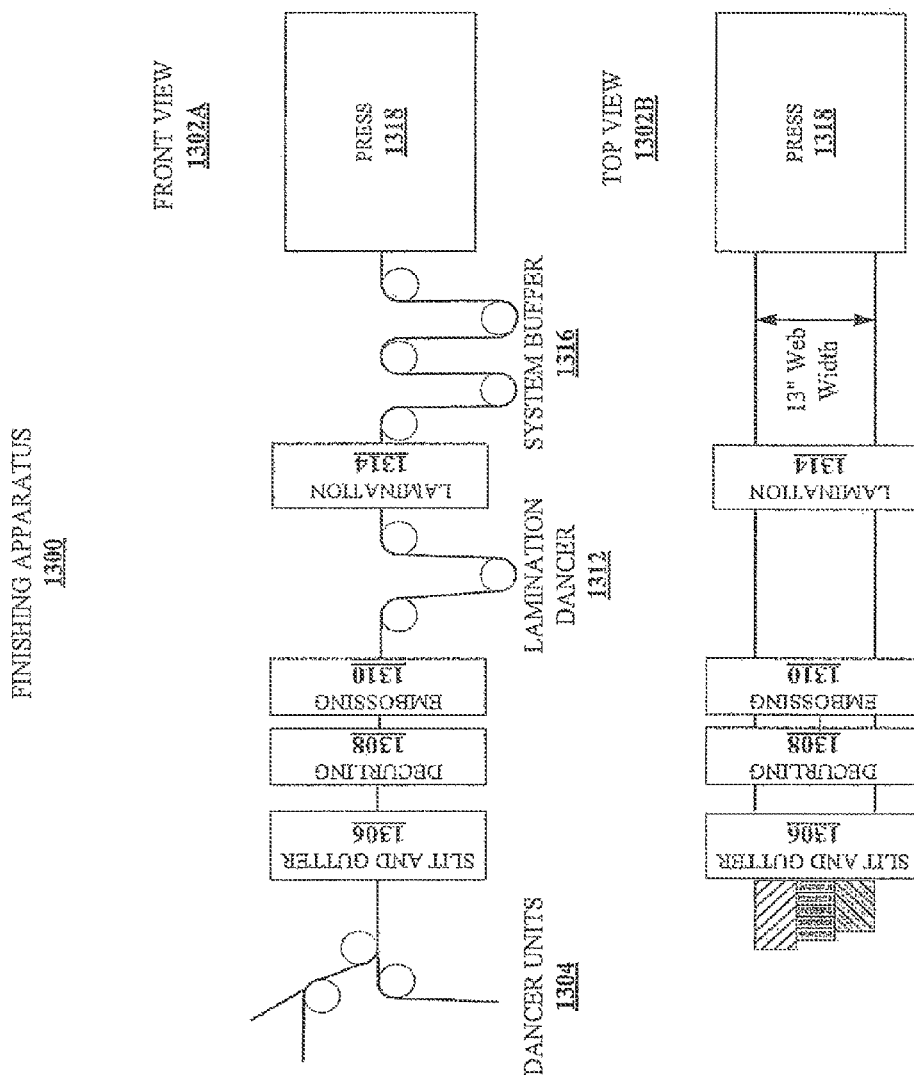
FIG. 13 illustrates a block diagram of a sample cutting and finishing apparatus disclosed herein.

FIG. 13 illustrates a block diagram of a finishing apparatus 1300 according to alternative or additional aspects of the subject disclosure. Finishing apparatus 1300 can be operated in similar fashion as finishing apparatuses 1000, 1100 or 1200, above, in various print stream formats (e.g., 4R, 5R, 6R, 8R, . . . ). A print substrate, after being cut but a set of cutters (not depicted) into a number of print streams (e.g., three print streams for a 4R format) is fed by dancer units 1304 to a slit and gutter module 1306, which can be configured to remove print media within a slit layer(s) or gutter layer(s) of the print substrate. A decurling module 1308 can de-curl print media edges, and an embossing module 1310 can apply an embossing procedure to the print stream(s), creating highlights or shadows to represent light/dark boundaries of respective images in the print stream(s). A lamination dancer 1312 can be employed to support end of frame/repeat length stops, and feed the print streams to lamination module 1314 for laminating print media streams. Although lamination dancer 1312 is depicted between embossing module 1310 and lamination module 1314, one or more other dancers can be positioned between other modules (e.g., between slit and gutter module 1306 and decurling module 1308, or others) per design preferences. A system buffer 1316 can feed laminated print media to press 1318 for printing. Top view 1302B depicts finishing apparatus 1300 from above, and illustrates how, in this case, three separate print streams fed to slit and gutter module 1306 can be maintained within a 13 inch web width throughout the various modules of finishing apparatus 1300.

Figure 14:
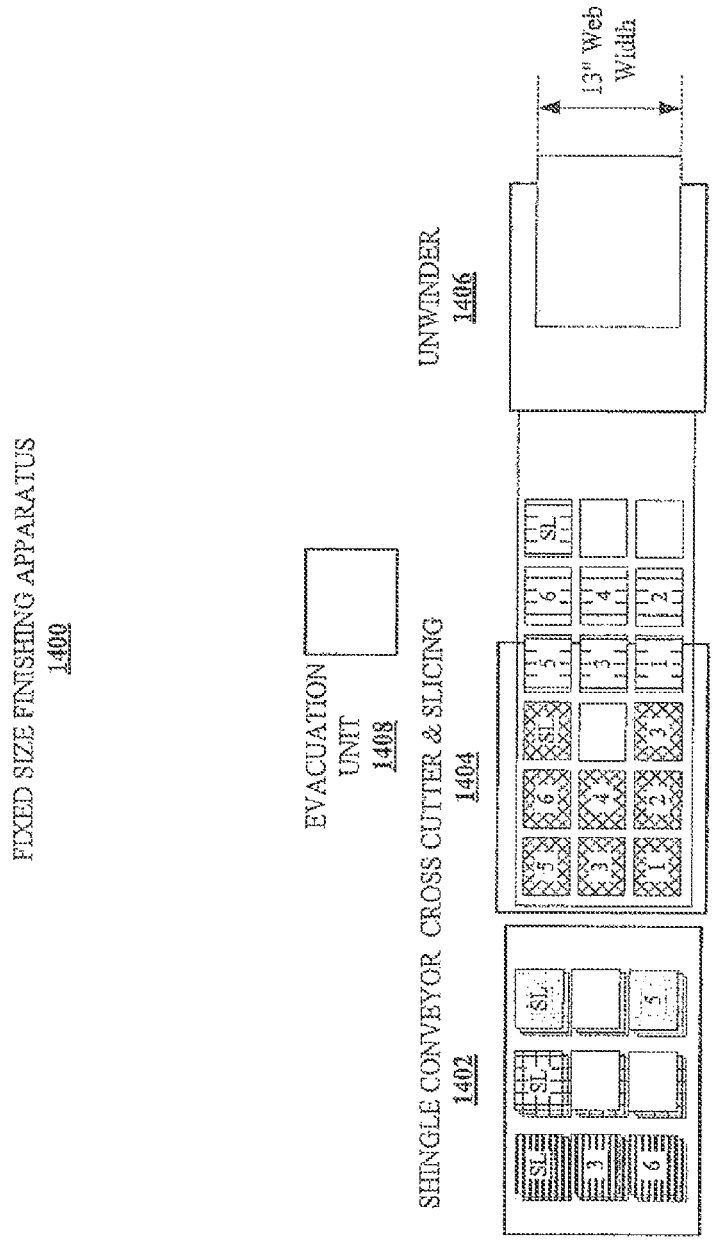
FIG. 14 depicts a block diagram of a sample fixed size finishing layout for high volume photofinishing, in additional aspects.

FIG. 14 illustrates a block diagram of an example fixed size finishing apparatus 1400 according to further aspects of the subject disclosure. Fixed size finishing apparatus 1400 can be configured for various fixed size print formats, in which images or photographs of a particular format have a common width and length. It should be appreciated, however, that fixed size finishing apparatus 1400 can be configured for different formats, having different common widths and common lengths, for different operation runs. For instance, in a first run fixed size finishing apparatus 1400 can be configured for a 4 inch by 6 inch format, and then reconfigured for a 5 inch by 7 inch format for a second run, and so on.

Fixed size finishing apparatus 1400 can comprise a shingle conveyor 1402 that feeds streams of print media to a cross cutter and slicing unit 1404. Cross cutting and slicing unit 1404 can be configured to separate individual photographs, or individual portions of print media, into individual cuts, as depicted. These individual cuts can be conveyed along one or more dancers (not depicted), a conveyor, or the like, to an unwinder 1406. Particularly, the individual cuts, before and after cross cutting and slicing, can be maintained according to a web width orientation, depicted at 13 inches for the example of FIG. 14. Other suitable web width orientations can be employed as well, and the subject disclosure is not limited to the 13 inch web width.

In addition to the foregoing, fixed size finishing apparatus 1400 can comprise an evacuation unit 1408. Evacuation unit can be a device configured to remove extraneous print media removed from the individual cuts by cross cutter and slicing unit 1404. This extraneous print media can comprise gutter layers between individual cuts of print media, slitting layers at an outer ends of print media, control slate regions, end of frame slate regions, error prints, or other non-print media.

Figure 15:
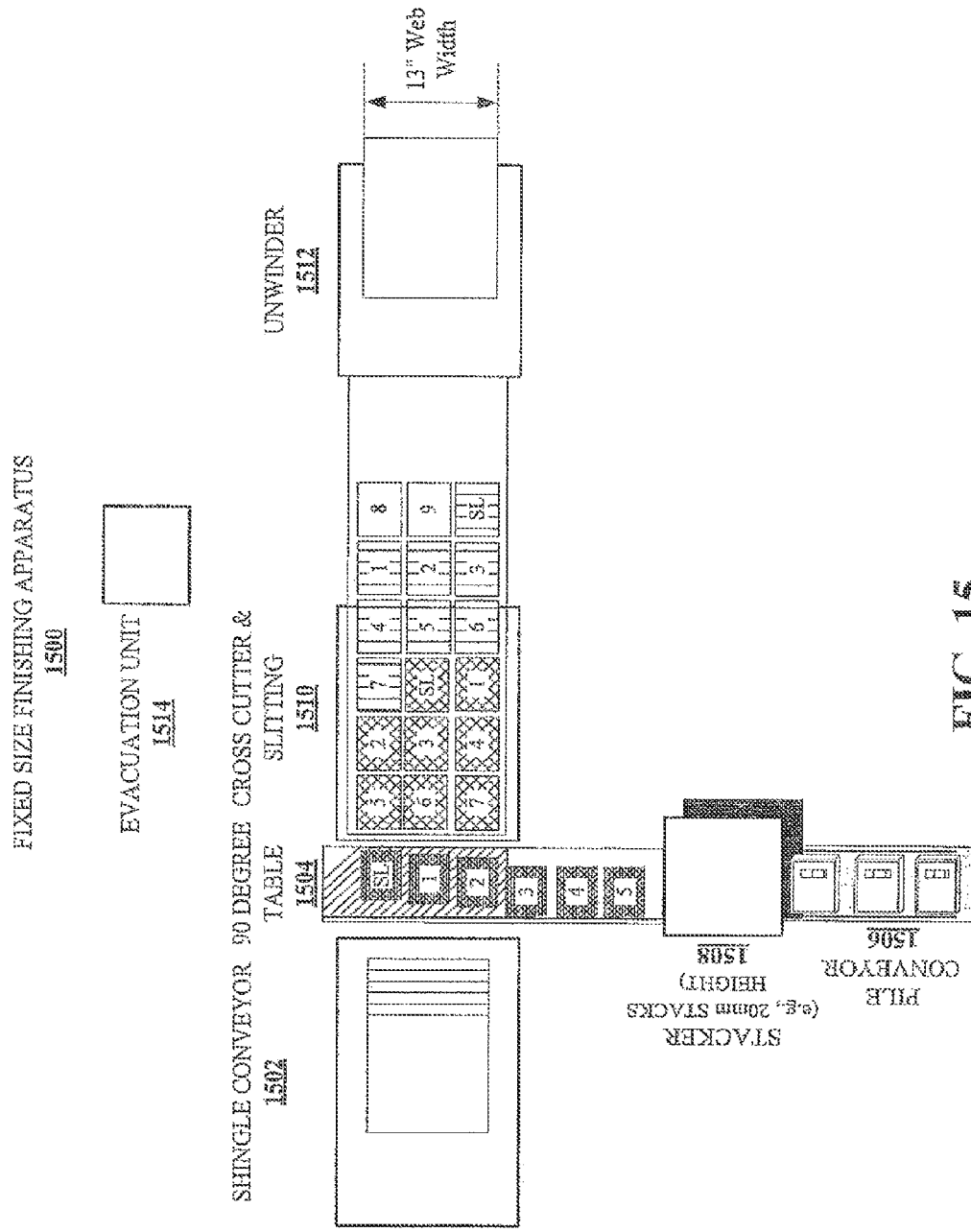
FIG. 15 illustrates a block diagram of an example fixed size finishing layout according to alternative or additional aspects.

FIG. 15 illustrates a block diagram of a fixed sized finishing apparatus 1500 according to alternative or additional aspects of the subject disclosure. Fixed size finishing apparatus 1500 can be configured for various size print formats having fixed image length. Similar to fixed size finishing apparatus 1400 of FIG. 4, supra, fixed size finishing apparatus 1500 can be configured for different formats on different print runs, and is not limited to a single size photograph per run. Thus, on a first run fixed sized finishing apparatus 1500 can be configured to operate with one or more streams of 8 inch by 10 inch photographs, whereas on a subsequent run fixed sized finishing apparatus 1500 can be reconfigured to operate with one or more streams of 12 inch by 10 inch photographs, and so on.

Fixed size finishing apparatus 1500 can comprise a shingle conveyor 1502 for delivering uncut print media to a 90 degree table 1504. 90 degree table 1504 can comprise a pile conveyor 1506 for dispersing segments of print media (e.g., corresponding with different batches of images, or corresponding with a certain length of print media independent of batch, or the like, or a suitable combination thereof) along a length of 90 degree table 1054. A stacker 1508 can be configured to form the print media into stacks of a predetermined height (e.g., 20 mm, . . . ). From 90 degree table 1504, respective segments of print media are provided to a cross cutter and slitting unit 1510 for separating segments of print media into individual cuts, and for providing the individual cuts to a conveyor for transport to an unwinder 1512. Note that cross cutter and slicing unit 1510, the conveyor and unwinder 1512 can maintain segments of print media or individual cuts of print media within an overall web width dimension (e.g., 13 inches wide) employed by fixed size finishing apparatus 1500 in general. Thus, the web width can be maintained by shingle conveyor 1502, cross cutter and slicing unit 1510 and unwinder 1512 (though 90 degree table 1504 can be configured to operate outside the web width dimension, as depicted). An evacuation unit 1514 can be operated in conjunction with cross cutter and slicing unit 1510 to remove extraneous print media cut away by cross cutter and slicing unit 1510.

Figure 16:
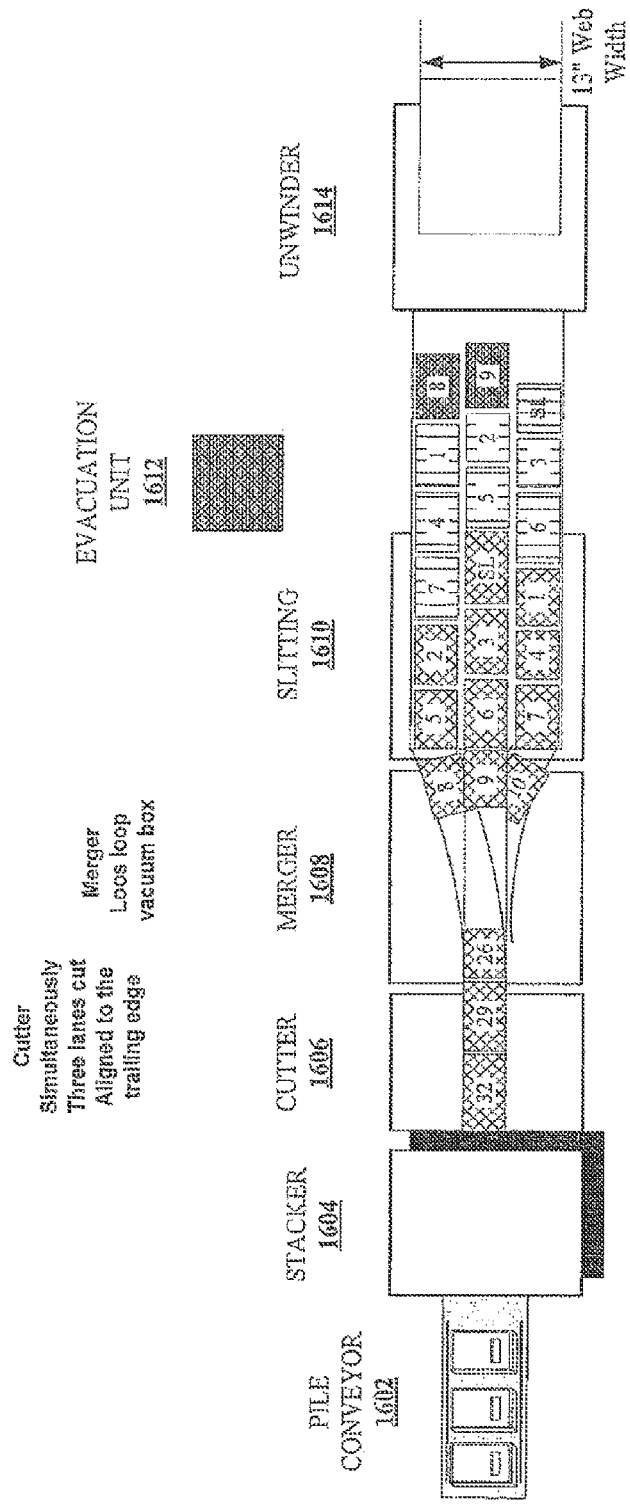
FIG. 16 depicts a flowchart of a sample method for providing low environmental impact photofinishing according to an aspect.

FIG. 16 illustrates a block diagram of an example variable size imposition and finishing apparatus 1600 according to one or more further aspects of the subject disclosure. Imposition and finishing apparatus 1600 can comprise a pile conveyor 1602, for providing print streams of photographs for finishing and collating operations of imposition and finishing apparatus 1600. Photographs are fed by pile conveyer 1602 to a stacker 1604 that forwards photographs in a manner that stops a trailing edge of respective photographs or rolls of photographs beneath a cutting edge of a cutter 1606. Cutter 1606 can be configured to concurrently separate a plurality of mini-rolls, or streams of photographs, which can be formed into multiple respective lanes of photographs by a merger 1608, as depicted. Merger 1608 can send respective lanes of photographs to a cutting device of a slitter 1610 for removing print media material designated for removal, such as designated slitting or gutter regions. In at least one aspect, merger 1608 can organize photographs or rolls into separate lanes based on photo size (e.g., photo width)—whether fixed or variable. Separation can be determined from a multi-dimensional matrix code located in a control slate. The multi-dimensional matrix can specify, for instance, a table representing respective widths or lengths of individual photographs. Extraneous regions are depicted by dark shading, and can be removed by an evacuation unit 1612. An unwinder 1614 can be employed for arranging finished photographs in an arrangement for output from imposition and finishing apparatus 1600. Similar to finishing apparatus 1500 of FIG. 15, supra, merger 1608, slitting 1610 and unwinder 1614 can organize or maintain segments of print media or individual cuts of print media within an overall web width dimension (e.g., 13 inch web width) employed by imposition and finishing apparatus 1600.

The aforementioned diagrams have been described with respect to interaction between systems, apparatuses, hardware components or software components. It should be appreciated that such diagrams can include those components or systems specified therein, some of the specified components, or additional components. For example, a system could include system 200 in which a photo layout generated by print process management apparatus 206 can comprise the variable size 4R photo layout depicted at FIGS. 8 and 9, and photo and finishing 214 can comprise 4R format finishing apparatus 1000. Sub-components could also be implemented as components communicatively or operably connected to other sub-components rather than included within a parent component. Additionally, it should be noted that two or more components could be combined into a single component providing aggregate functionality. For instance, batch production management layer 210 can include print queue management component 212 to facilitate generating batch controls and finishing marks for a photo layout and scheduling print jobs consistent with print resources, by way of a single component. Components of the disclosed systems and apparatuses can also interact with one or more other components not specifically described herein but known by those of skill in the art, or made known to one of skill in the art by way of the context provided herein.

Figure 17:
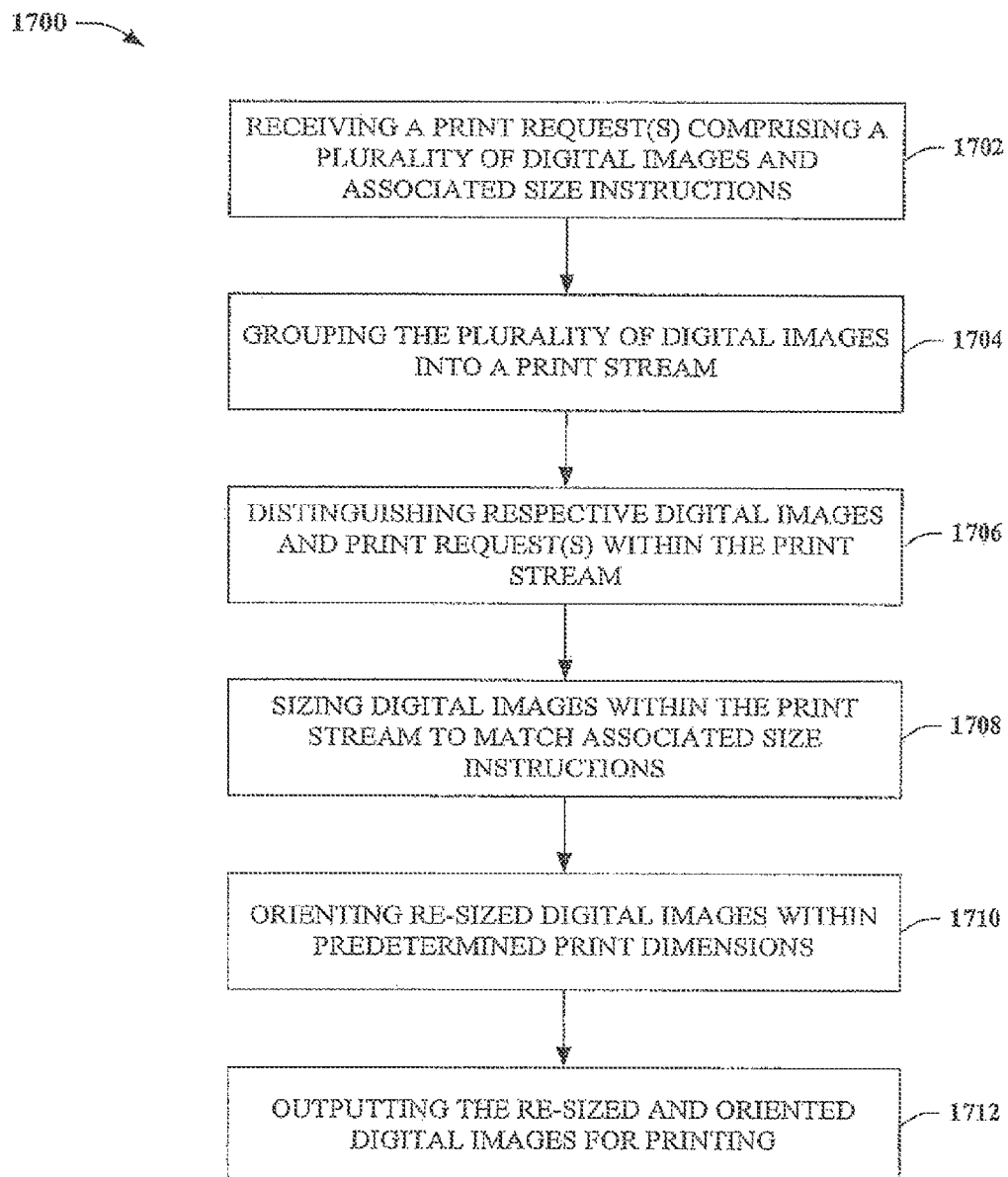
FIGS. 17 and 18 illustrate a flowchart of an example method for providing work flow and finishing for web-originated photo requests, in yet other aspects.
Figure 18:
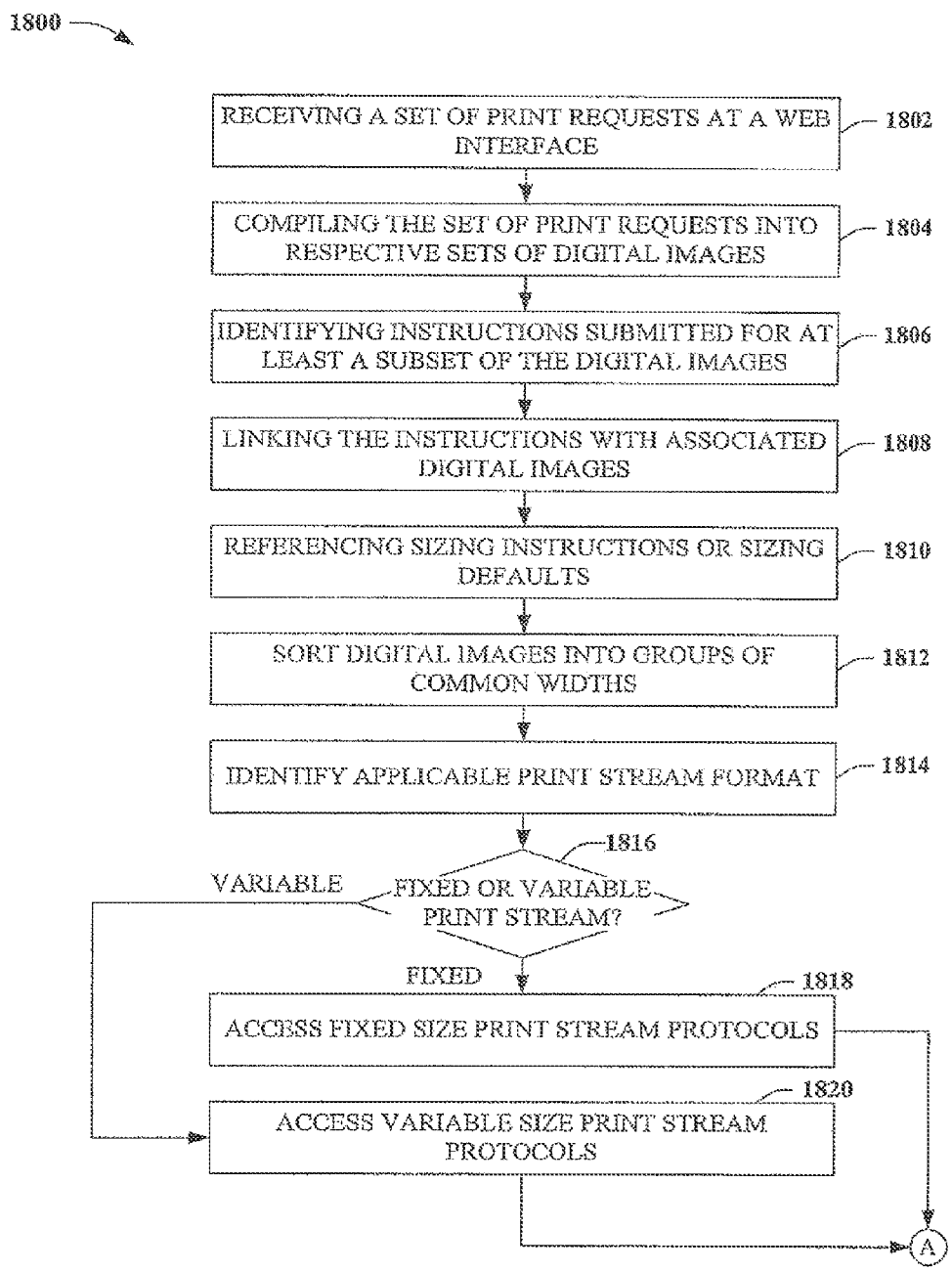
Figure 19:
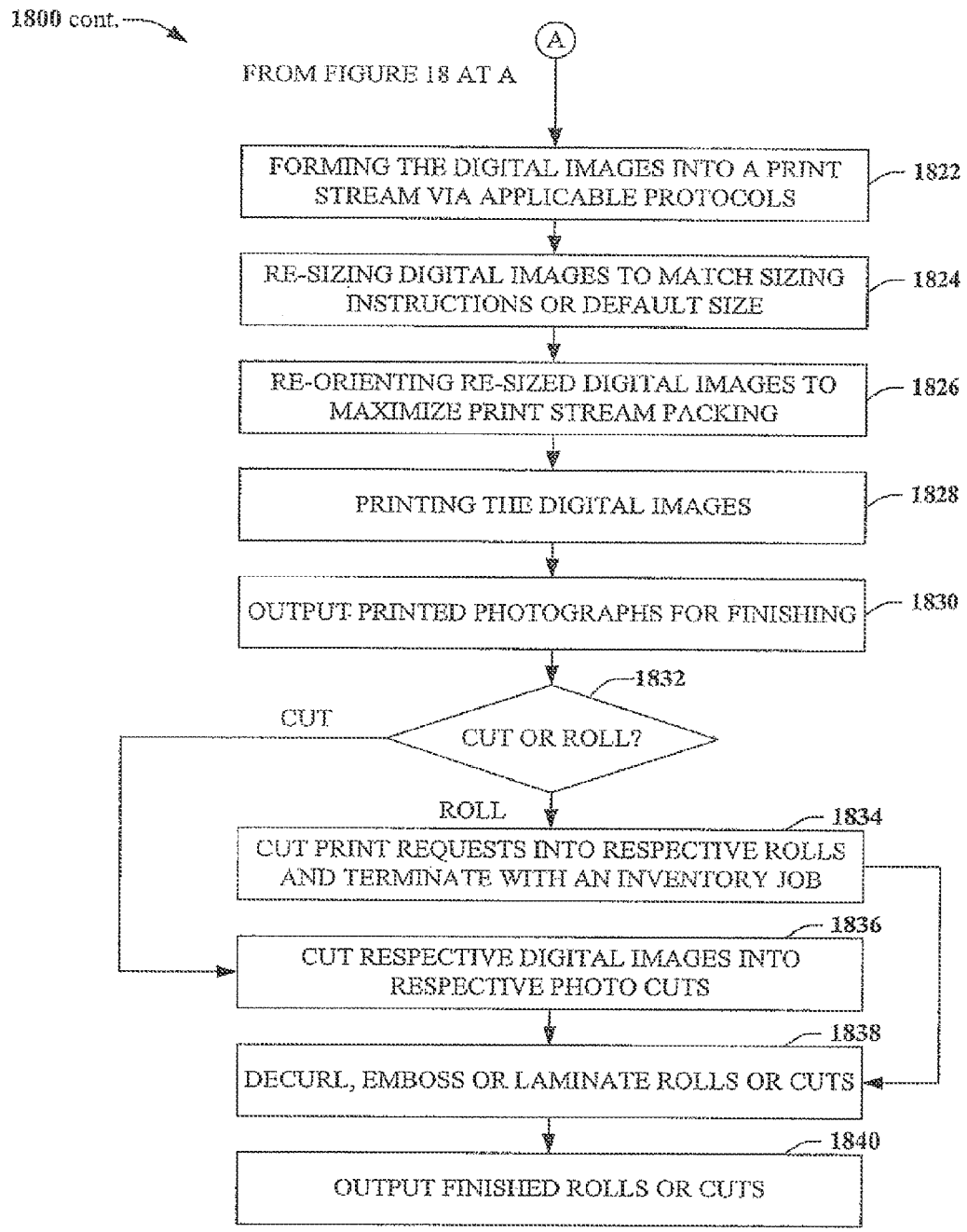
FIG. 19 illustrates a flowchart of an example method for providing workflow and finishing solutions for high volume photo printing, according to particular aspects of the subject disclosure.

In view of the exemplary diagrams described supra, process methods that may be implemented in accordance with the disclosed subject matter will be better appreciated with reference to the flow charts of FIGS. 17-19. While for purposes of simplicity of explanation, the methods are shown and described as a series of blocks, it is to be understood and appreciated that the disclosed subject matter is not limited by the order of the blocks, as some blocks may occur in different orders or concurrently with other blocks from what is depicted and described herein. Moreover, not all illustrated blocks may be required to implement the methods described hereinafter. Additionally, it should be further appreciated that operational instructions of methods disclosed throughout this specification are capable, in whole or in part, of being stored on an article of manufacture to facilitate transporting and transferring such methods to a machine, a robot, a computer, or other mechanical device, electrical device, computing device, and so on.

Referring to FIG. 17, a flowchart of an example method 1700 for providing workflow and finishing solutions for photograph printing is depicted. At 1702, method 1700 can comprise receiving a print request(s) comprising a plurality of digital images and a print instruction(s) pertinent to a subset of the plurality of digital images. Print requests can be received electronically, comprising electronic files containing one or more of the digital images. Additionally, print instructions can include print dimensions, quality, resolution, graphical specifications, color scheme, finishing details, or the like, or a suitable combination thereof.

At 1704, method 1700 can comprise grouping the plurality of digital images into a print stream(s) and writing print control data into the print stream. The print stream can comprise a single row of images, or multiple rows of images. A number of rows of images can be determined, for instance, based on image size instructions and dimensions of a print substrate. Further, print control data can identify respective print requests, or print jobs, and specify images belonging to a particular print job. The print control data can also include print instructions for a subset of the digital images (e.g., in a machine-readable data format). Print control data can also comprise end of image markers, end of page/repeat length markers, an eye-mark(s) for orienting print or finishing hardware, or the like, or a combination thereof.

At 1706, method 1700 can comprise distinguishing respective digital images and print request(s) within the print stream. At 1708, method 1700 can comprise sizing digital images within the print stream to match the print instruction(s). At 1710, method 1700 can comprise orienting re-sized digital images within predetermined print dimensions. The predetermined print dimensions can comprise dimensions pertaining to a print format chosen for the digital images (e.g., based on a print size instruction), and substrate dimensions. At 1712, method 1700 can comprise outputting the re-sized and oriented digital images to a printing process for rendering the digital images on physical media.

FIGS. 18 and 19 depict a flowchart of an example method 1800 for providing workflow and finishing solutions for high volume photo printing, according to particular aspects of the subject disclosure. At 1802, method 1800 can comprise receiving a set of print requests at a web interface. At 1804, method 1800 can comprise compiling the set of print requests into respective sets of associated digital images. At 1806, method 1800 can comprise identifying instructions submitted for at least a subset of the digital images. At 1808, method 1800 can comprise linking the instructions with associated digital images. At 1810, method 1800 can comprise referencing sizing instructions or sizing defaults for respective digital images or groups of digital images. At 1812, method 1800 can comprise sorting digital images into groups of common widths. At 1814, method 1800 can comprise identifying applicable print stream formats for groups of digital images having common widths, and applying respective print stream formats for respective groups of digital images.

At 1816, method 1800 can determine whether fixed or variable print stream printing is applicable for the print requests. The determination can be based on print capabilities of an associated printing device, size of print substrate, or can be customer specified. If fixed print stream printing is applicable, method 1800 can proceed to 1818, where fixed size protocols are accessed for the print stream. Otherwise, method 1800 proceeds to 1820, where variable size protocols are accessed for the print stream. In the event that fixed and variable print streams can be employed, method 1800 can access both fixed size protocols and variable sized protocols and apply them to a fixed sized print stream(s) and variable sized print stream, respectively. From 1820, method 1800 proceeds to FIG. 19.

Referring now to FIG. 19, at 1822, method 1800 can comprise forming the digital images into a print stream(s) via applicable protocols. At 1824, method 1800 can comprise re-sizing digital images to match sizing instructions, or a default size. At 1826, method 1800 can comprise re-orienting the re-sized digital images to maximize print stream packing. At 1828, method 1800 can comprise printing the digital images. At 1830, method 1800 can comprise outputting printed photographs for finishing.

At 1832, method 1800 can make a determination as to whether finished photographs are to be individually cut or cut into a mini-roll(s). If cut into a mini-roll(s), method 1800 can proceed to 1834, and cut respective print requests into one or more respective mini-rolls, wherein the mini-rolls are terminated by an end of roll inventory job that can include information about the mini-rolls, or information pertaining to jobs within the mini-rolls, such as a number of jobs, number of photographs per job, size of respective photographs, print format utilized for the jobs, as well as information pertaining to subsequent jobs in one or more subsequent mini-rolls where suitable, or the like, or a suitable combination thereof. Additionally, the end of roll inventory job can comprise an eye-mark for synchronizing cutting and slitting equipment. If finished photographs are individually cut, method 1800 can proceed to 1836, and cut respective digital images into respective photo cuts. Following cutting, method 1800 proceeds at 1838, and can comprise decurling, embossing or laminating rolls or cuts of photographs. At 1840, method 1800 can comprise outputting finished rolls or cuts of photographs.

To the extent that terms "includes," "has," "contains," and other similar words are used in herein, such terms are intended to be inclusive—in a manner similar to the term "comprising" as an open transition word—without precluding additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under the foregoing instances. In addition, the articles "a" and "an" as herein should generally be construed to mean "one or more" unless specified otherwise or clear from context to be directed to a singular form.

What is claimed is:

1. A system for processing print orders, the system comprising:
   - a formatting component to convert digital images from received print requests into a bitmap format;
   - a rendering engine to selectively arrange and re-size the digital images according to a print instruction; and
   - a layout engine to position the digital images into a plurality of parallel print streams, the plurality of parallel print streams to print side-by-side across a width of a print media, such that different print jobs are printed simultaneously in parallel print streams;
   - wherein the print streams have a common width and different print streams contain printed images of different lengths, and
   - the system outputs cuts and rolls simultaneously from different print streams, wherein rolls comprise uncut adjacent images and control slates from a print stream.

2. The system of claim 1, wherein a print stream includes printed images of various lengths.

3. The system of claim 1, wherein the system comprises an output mechanism that outputs cut prints.

4. The system of claim 1, wherein the system comprises an output mechanism that outputs rolls.

5. The system of claim 1, wherein the layout engine positions the digital images based on a quantity of pending print requests.

6. The system of claim 1, wherein the system receives and processes print requests while printing images on a substrate.

7. The system of claim 1, wherein a print job includes digital images printed in multiple print streams that are automatically combined into a single stack.

8. The system of claim 7, further comprising a 90 degree table, wherein the 90 degree table arranges images from multiple print streams for stacking into a single stack.

9. The system of claim 1, further comprising a laminator for laminating the print media.

10. The system of claim 9, further comprising a buffer receiving the printed print media after a press.

11. The system of claim 9, further comprising a slit and gutter module to separate the print media in to a plurality of separate print streams.

12. The system of claim 11, further comprising a dancer that receives a separate print stream of the plurality of separate print streams.

13. The system of claim 11, further comprising a merger to merge the plurality of separated print streams.

14. The system of claim 13, further comprising a cutter to cut the merged print streams simultaneously.

\* \* \* \* \*

UNITED STATES PATENT AND TRADEMARK OFFICE
CERTIFICATE OF CORRECTION

| | | |
|---|---|---|
| PATENT NO. | : 9,538,020 B2 | Page 1 of 1 |
| APPLICATION NO. | : 14/666130 | |
| DATED | : January 3, 2017 | |
| INVENTOR(S) | : David Yasinover et al. | |

It is certified that error appears in the above-identified patent and that said Letters Patent is hereby corrected as shown below:

On the Title Page

In item (72), Inventors, in Column 1, Line 1, delete "Nes Ziona" and insert -- Ness Ziona --, therefor.

In item (72), Inventors, in Column 1, Line 2, delete "Nes Ziona" and insert -- Ness Ziona --, therefor.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*